US008204969B2

(12) United States Patent
Carcerano et al.

(10) Patent No.: US 8,204,969 B2
(45) Date of Patent: Jun. 19, 2012

(54) METHOD FOR RETRIEVING UPDATES VIA THE INTERNET

(75) Inventors: Christopher John Carcerano, Aliso Viejo, CA (US); Yeongtau Louis Tsao, Irvine, CA (US); Attaullah Samsul Seikh, Irvine, CA (US); William Zhang, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 988 days.

(21) Appl. No.: 12/186,474

(22) Filed: Aug. 5, 2008

(65) Prior Publication Data

US 2010/0037216 A1 Feb. 11, 2010

(51) Int. Cl.
*G06F 15/177* (2006.01)

(52) U.S. Cl. ........ 709/221; 709/202; 709/203; 709/219; 709/224; 709/226

(58) Field of Classification Search .................. 709/221, 709/202, 203, 219, 224, 226
See application file for complete search history.

(56) References Cited

U.S. PATENT DOCUMENTS

| | | | | |
|---|---|---|---|---|
| 5,809,251 | A | 9/1998 | May et al. | 395/200.53 |
| 5,933,646 | A | 8/1999 | Hendrickson et al. | 395/712 |
| 5,933,647 | A | 8/1999 | Aronberg et al. | 395/712 |
| 5,999,741 | A | 12/1999 | May et al. | 395/712 |
| 6,067,582 | A | 5/2000 | Smith et al. | 710/5 |
| 6,073,214 | A | 6/2000 | Fawcett | 711/133 |
| 6,094,679 | A | 7/2000 | Teng et al. | 709/220 |
| 6,125,372 | A | 9/2000 | White | 707/205 |
| 6,151,643 | A | 11/2000 | Cheng et al. | 710/36 |
| 6,199,204 | B1 | 3/2001 | Donohue | 717/11 |
| 6,202,207 | B1 | 3/2001 | Donohue | 717/11 |
| 6,324,691 | B1 * | 11/2001 | Gazdik | 717/178 |
| 6,381,742 | B2 | 4/2002 | Forbes et al. | 717/11 |
| 6,442,754 | B1 | 8/2002 | Curtis | 717/175 |
| 6,493,871 | B1 | 12/2002 | McGuire et al. | 717/173 |
| 6,542,943 | B2 | 4/2003 | Cheng et al. | 710/36 |
| 6,814,510 | B1 | 11/2004 | Sabbagh et al. | 400/63 |
| 6,941,453 | B2 | 9/2005 | Rao | 713/2 |
| 6,996,815 | B2 | 2/2006 | Bourke-Dunphy et al. | 717/168 |
| 6,996,818 | B2 | 2/2006 | Jacobi et al. | 717/170 |
| 7,062,765 | B1 | 6/2006 | Pitzel et al. | 717/177 |
| 7,093,246 | B2 | 8/2006 | Brown et al. | 717/173 |
| 7,117,355 | B2 | 10/2006 | Zomaya et al. | 713/100 |
| 7,143,406 | B2 | 11/2006 | Kenyon et al. | 717/173 |
| 7,197,634 | B2 | 3/2007 | Kruger et al. | 713/1 |
| 7,203,723 | B2 | 4/2007 | Ogawa | 709/203 |
| 7,222,341 | B2 | 5/2007 | Forbes et al. | 717/170 |
| 2004/0031028 | A1 | 2/2004 | Hunt et al. | 717/170 |
| 2004/0031029 | A1 | 2/2004 | Lee et al. | 717/171 |
| 2004/0045012 | A1 | 3/2004 | Doraisamy | 719/321 |

(Continued)

*Primary Examiner* — Lan-Dai T Truong
(74) *Attorney, Agent, or Firm* — Fitzpatrick, Cella, Harper & Scinto

(57) ABSTRACT

A device includes a software agent that discovers a controller. Current state information indicating upgradeable files currently installed on the device is maintained. The agent sends the current state information to the controller, and the controller sends the current state information to a repository, via the Internet. The repository determines upgradeable files currently installed on the device based on the current state information, and checks for file updates for the upgradeable files. The repository sends file update information to the controller. The file update information includes file update locations. The controller sends the file update information to the agent, and the agent requests the controller to retrieve file updates. The controller retrieves each file update from its file update location on the Internet. The controller sends a notification to the agent when the file updates are retrieved, and the agent retrieves the file updates from the controller.

17 Claims, 10 Drawing Sheets

U.S. PATENT DOCUMENTS

2004/0226008 A1 11/2004 Jacobi et al. .................. 717/168
2004/0250245 A1* 12/2004 Rao et al. ...................... 717/168
2005/0186952 A1* 8/2005 Kitajima ....................... 455/419
2006/0031827 A1 2/2006 Barfield et al. ............... 717/168
2006/0277279 A1 12/2006 Hase ............................. 709/220
2007/0006207 A1 1/2007 Appaji .......................... 717/168
2009/0024992 A1* 1/2009 Kulaga et al. ................. 717/177
2009/0044183 A1* 2/2009 Quin et al. .................... 717/169
2009/0077549 A1* 3/2009 Sadja et al. ................... 717/178
2009/0271507 A1* 10/2009 Kodimer ....................... 709/224

* cited by examiner

METHOD FOR RETRIEVING UPDATES VIA THE INTERNET

BACKGROUND

1. Field

The present disclosure relates to retrieving updates via the Internet for use by a device not ordinarily connected to the Internet.

2. Description of the Related Art

Computers can be programmed to discover and download updates for installed software by logging onto update servers via the Internet. Typically, a computer logs onto a different update server for each software vendor. For example, computers can log onto a Microsoft™ update server and check for updates for Microsoft™ software, and computers can log onto an Apple™ update server and check for updates for Apple™ software.

SUMMARY

A limitation of typical methods for discovering and updating software noticed by the inventors herein is that some devices may not be able to connect to an update server directly. For example, some devices may not include required software or hardware necessary for communicating with an update server directly, such as over the Internet, or may lack sufficient resources (i.e., memory and processing power) for communicating directly with an update server.

Another limitation noticed by the inventors is that devices may need to determine which software components are already installed to identify which updates are needed. For example, a device may compare version numbers of installed software with version numbers of software updates to determine which updates to download. However, some devices may not have sufficient resources (i.e., memory and processing power) necessary for identifying and downloading available updates.

Furthermore, if software from different vendors is installed, it might be necessary for the device to communicate with an update server for each different vendor to discover available updates. For example, if a device has software from multiple vendors, the device may need to determine which update servers to log onto, in addition to determining which files are needed from each update server. This process may further increase processing requirements needed for performing a software update request.

The embodiments of the present invention addresses these limitations, by providing a method wherein devices with limited resources can receive software updates stored on a repository accessible via the Internet, in addition to any other type of file updates for updating information stored in files on the device, indirectly from the repository without directly communicating with the repository.

According to one aspect of the disclosure, a device includes a software agent and is communicatively coupled to a separate controller that includes a connection to the Internet. This controller performs any communication and processing that may not be performed by the agent. More particularly, the agent discovers the controller when the controller is communicatively coupled to the device. Current state information indicating upgradeable files currently installed on the device is maintained. The agent sends the current state information to the controller, and the controller sends the current state information to the repository, via the Internet. The repository determines upgradeable files currently installed on the device based on the current state information, and checks for file updates for the determined upgradeable files. The repository sends file update information for discovered file updates to the controller. The file update information includes file update locations, which are locations on the Internet of each file update. The controller sends the file update information to the agent, and the agent requests the controller to retrieve file updates based on the file update information. The controller retrieves each file update from its file update location on the Internet. The controller sends a notification to the agent when the file updates are retrieved, and the agent retrieves the file updates from the controller, in response to the notification.

By virtue of using the controller, a device can retrieve files from a repository without directly communicating with the repository. In addition, the controller can perform communication and processing that may not be performed by an agent running on a device with limited resources.

The current state information can specify a list of upgradeable files currently installed on the device. The current file list can specify a version, file type, target operating system, and target processor for each upgradeable file, and the repository can check for file updates based on this information. The device can be a multifunction device that can be operable in different roles, and the current state information can specify a role of the device.

The file update locations can include locations on the repository and locations on other devices. The file update locations can be Universal Resource Locators (URLs).

Before retrieving file updates, the controller can discover other controllers capable of communicating with the device, and determine whether a discovered controller stores a requested file update. The agent can retrieve the stored file update from the discovered controller without having the original controller retrieve the file.

If the controller cannot process a request received by the agent, the controller can discover a new controller that can process the request, and send the agent controller location information for the new controller. The agent can resend the request to the new controller, based on the controller location information.

The file update information can comprise file installation information and file uninstall information. The file installation information can include information for retrieving and running an installation utility, and the file uninstall information can include information for retrieving and running an uninstall utility.

The controller can cache retrieved file updates. If the controller cannot store retrieved files in a persistent storage device, the controller can use a memory as a buffer to temporarily cache data to be transferred to the agent in chunks.

The file update information can indicate dependent files associated with the file updates. The controller can determine if the dependent files are installed on the device, and the controller can retrieve any dependent files not installed on the device.

The agent and controller can include at least one of video cameras, digital cameras, printers, computers, scanners, facsimile machines, copiers, display devices, network access points, photolithography systems, and computers.

The repository can include computers and network attached storage devices. The files can include software files and data files, the software files including application files, driver files, firmware files and middleware files, and the data files including text files, media files, and database files.

The software agent can include a Simple Object Access Protocol (SOAP) module for communicating with the controller using SOAP, the software agent can process update messages received from the controller, and the software agent can generate update messages sent to the controller. The controller can include an update service which includes a SOAP module for communicating with the agent and the repository, the update service can process update messages received from the agent and the repository, and the update service can generate update messages sent to the agent and the repository. The repository can include a repository module which includes a SOAP module for communicating with the controller using SOAP, the repository module can process update messages received from the controller, and the repository module can generate update messages sent to the controller.

A more complete understanding of the disclosure can be obtained by reference to the following detailed description in connection with the attached drawings.

DETAILED DESCRIPTION

First Embodiment

Figure 1:
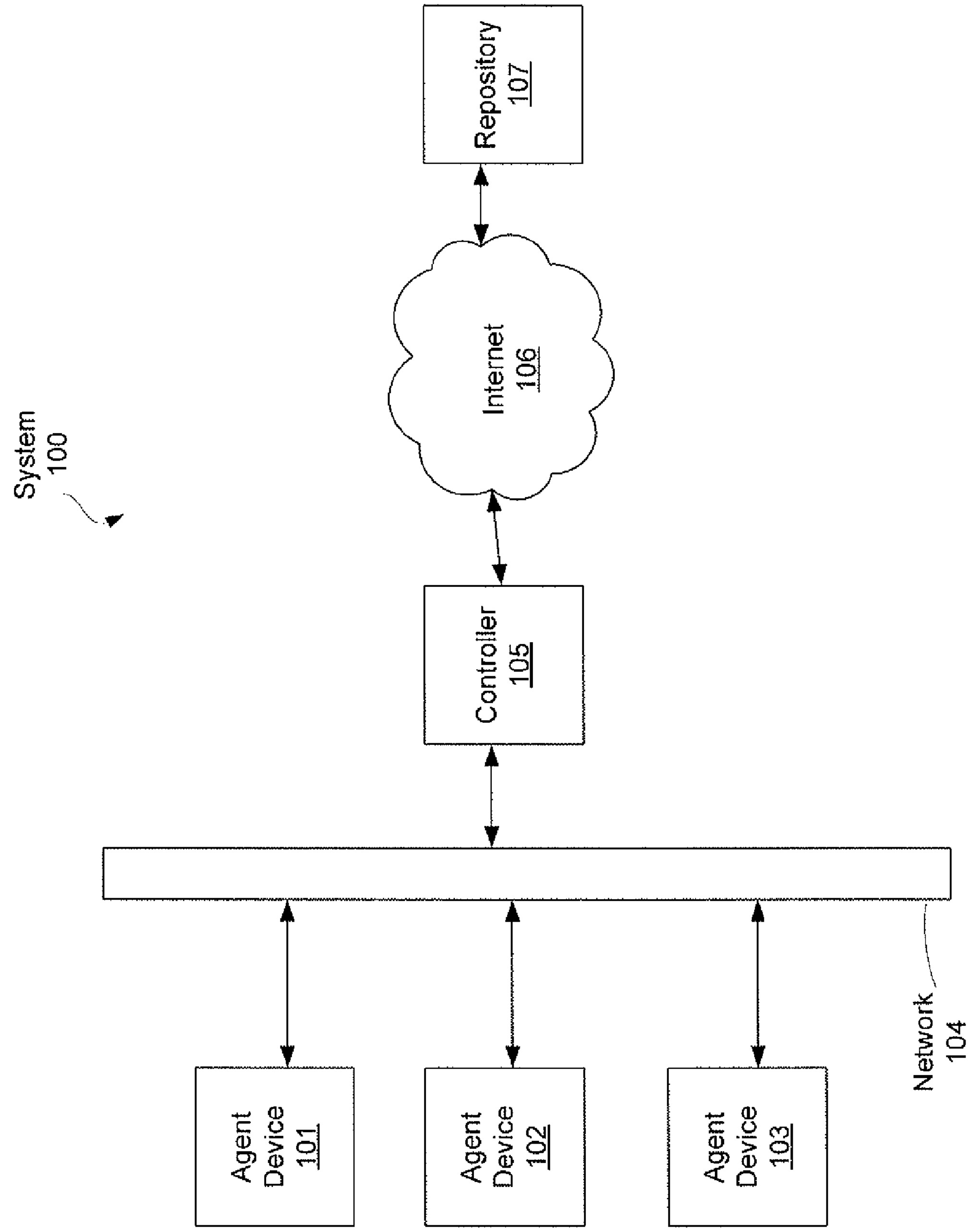
FIG. 1 depicts a file update system, according to a first example embodiment of the invention.

FIG. 1 depicts a file update system 100, which includes agent devices 101 to 103, controller 105, and repository 107. Agent devices 101 to 103 each include a software agent that runs on the device. Example agent devices include video cameras, digital cameras, printers, computers, scanners, facsimile machines, copiers, display devices, network access points, photolithography systems, and computers.

Agent devices 101 to 103 are each communicatively coupled to controller device 105 via network 104. In the first example embodiment, network 104 is an Intranet, but in other embodiments, network 104 can be, for example, a wireless network, a home network, or the like. Repository 107 is communicatively coupled to controller device 105 via network 106. In the first example embodiment, network 106 is the Internet, but in other embodiments, network 106 can be, for example, an Intranet, a wireless network, a home network, or the like. Agent devices 101 to 103 are not directly connected to the Internet 106, but rather communicate via the Internet 106 through controller device 105.

Controller 105 communicates with agent devices 101 to 103 and repository 107 using the Simple Object Access Protocol (SOAP), by sending messages over Hypertext Transfer Protocol (HTTP). However, in other embodiments, controller 105 can communicate with agent devices 101 to 103 and repository 107 using any other communication protocol that enables process-to-process communications over a network layer, such as, for example, HTTP over Secure Socket Layer (HTTPS), Simple Mail Transport Protocol (SMTP), or the like.

Agent devices 101 to 103 each include a processor coupled to a memory via a system bus. The processor is also coupled to external Input/Output (I/O) devices via the system bus and an I/O bus. A storage device having computer-readable media is coupled to the processor via a storage device controller and the I/O bus and the system bus. The storage device is used by the processor to store and read data and program instructions used to implement the file update retrieval processes to be described below in the description of FIG. 5.

Figure 2:
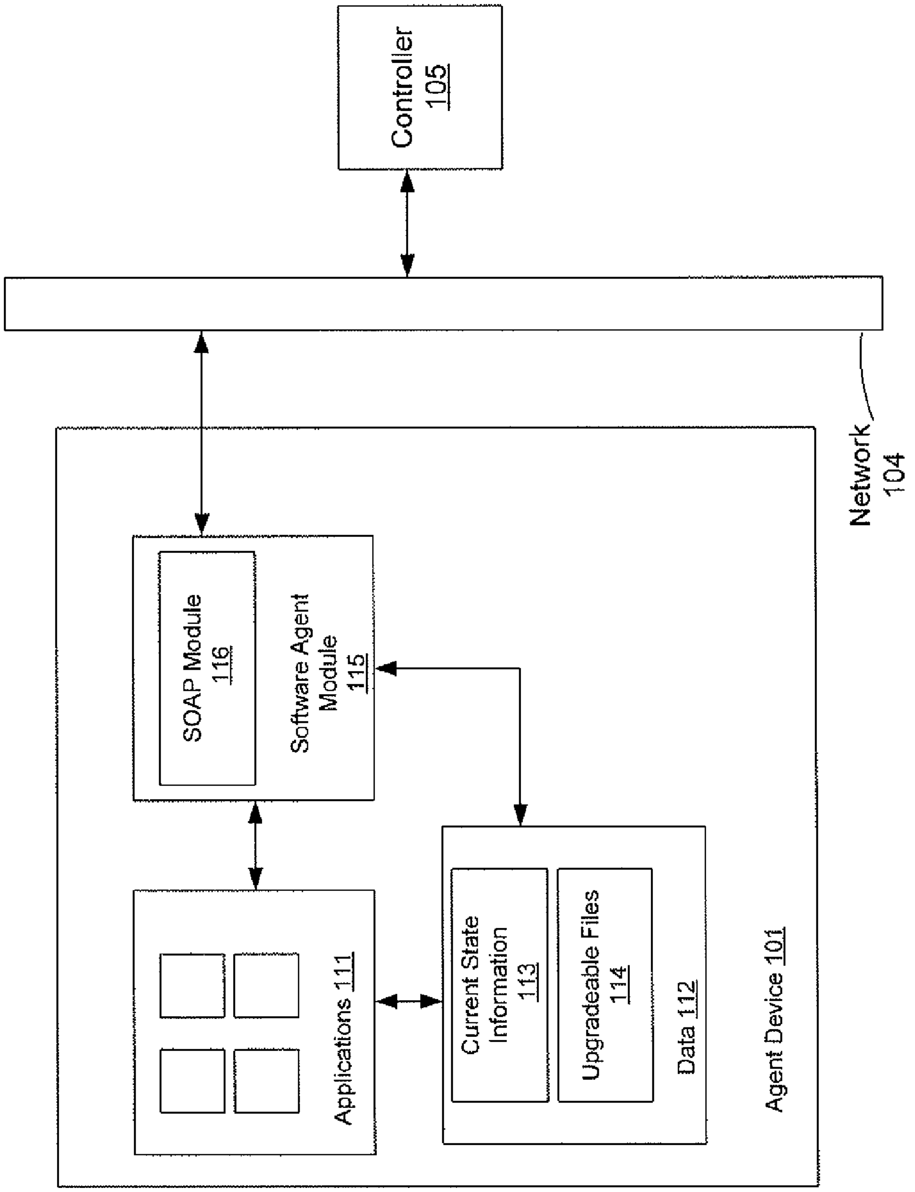
FIG. 2 is a more detailed diagram showing an agent device, according to a first example embodiment of the invention.

FIG. 2 shows agent device 101 in more detail. The agent device's program instructions include program instructions for the software agent 115 that runs on the agent device. The software agent 115 includes a Simple Object Access Protocol (SOAP) module 116 for communicating with controller 105 using SOAP. Software agent 115 processes update messages received from controller 105, and generates update messages sent to controller 105. The agent device's data 112 includes upgradeable information stored in files on the device (upgradeable files 114), and current state information 113. The current state information is maintained and compiled by the agent device, and specifies a list of upgradeable files currently installed on the agent device. This current file list specifies a name, description, version, file type, target operating system, and target processor for each upgradeable file. The upgradeable files include software files and data files. The software files include files that contain program instructions for applications 111, drivers, firmware and middleware that run on the agent device. Data files include text files, media files, and database files.

The agent device's processor may be further coupled to a user output device via a user output device controller coupled to the I/O bus. The agent device's processor may be further coupled to a user input device via a user input device controller coupled to the I/O bus.

The agent device's processor may be further coupled to a communications device via a communications device controller coupled to the I/O bus. The agent device's processor may use the agent device's communications device to communicate with a controller device (e.g., controller 105) for retrieving file updates. Examples of devices that may be coupled to the communications device include video cameras, digital cameras, printers, computers, scanners, facsimile machines, copiers, display devices, network access points, photolithography systems, and computers. The agent device's processor may use the communications device to communicate with a controller device directly, or indirectly via a network (e.g., 104).

In operation, the agent device's processor loads the program instructions from the storage device into the agent device's memory. The agent device's processor executes the loaded program instructions to implement the file update retrieval processes to be described below.

Figure 3:
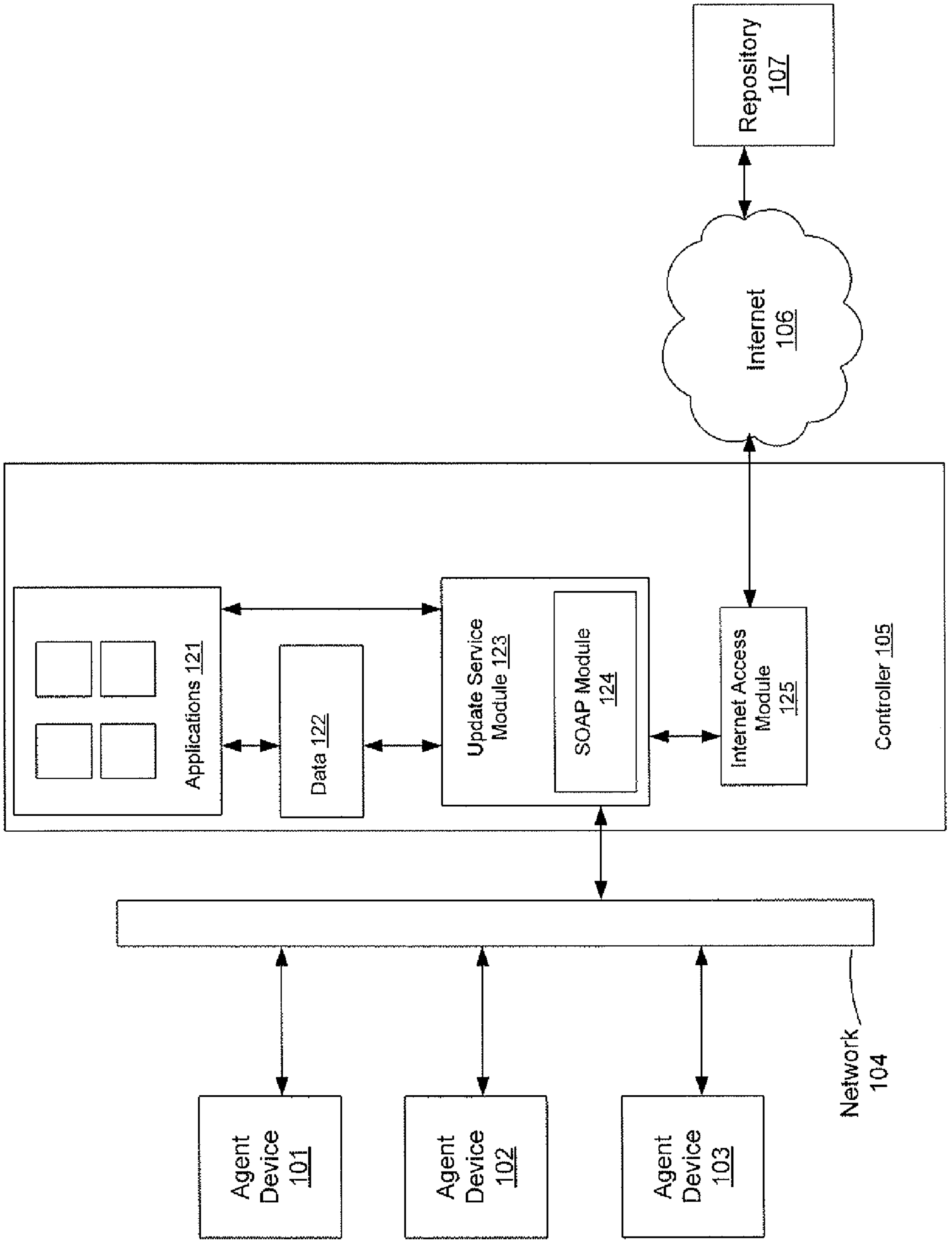
FIG. 3 is a more detailed diagram showing a controller, according to a first example embodiment of the invention.

FIG. 3 shows controller 105 in more detail. Controller 105 is a hardware device, such as, for example, a video camera, a digital camera, a printer, a computer, a scanner, a facsimile machine, a copier, a display device, a network access point, a photolithography system, a computer, or the like. Controller 105 includes a processor coupled to a memory via a system bus. The processor is also coupled to external Input/Output (I/O) devices via the system bus and an I/O bus. A storage device having computer-readable media is coupled to the processor via a storage device controller and the I/O bus and the system bus. The storage device is used by the processor to store and read data 122 and program instructions used to implement the file update retrieval processes to be described below in the description of FIG. 5.

The controller's program instructions include program instructions for the update service 123 that runs on the controller, program instructions for accessing the Internet (Internet Access Module 125), and program instructions for applications 121. The update service 123 includes a SOAP module 124 for communicating with agent devices 101 to 103 and repository 107. Update Service 123 processes update messages received from agent devices 101 to 103 and repository 107, and generates update messages sent to agent devices 101 to 103 and repository 107. The controller's processor may be further coupled to a user output device via a user output device controller coupled to the I/O bus. The controller's processor may be further coupled to a user input device via a user input device controller coupled to the I/O bus.

The controller's processor may be further coupled to a communications device via a communications device controller coupled to the I/O bus. The controller's processor may use the controller's communications device to communicate with an agent device (e.g., agent 101 to 103) for receiving file update requests and for transferring file update information. The controller's processor may use the communications device to communicate with an agent device directly, or indirectly via a network (e.g., 104). The controller's processor may also use the communications device to communicate with a repository (e.g., 107) via a network (e.g., 106). In the first example embodiment, the network used by controller 105 to communicate with the repository (e.g., 107) is the Internet (e.g., 106), but in other embodiments, this network 106 can be, for example, an Intranet, a wireless network, a home network, or the like.

In operation, the controller's processor loads the controller's program instructions from the storage device into the controller's memory. The controller's processor executes the loaded program instructions to implement the file update retrieval processes to be described below.

Figure 4:
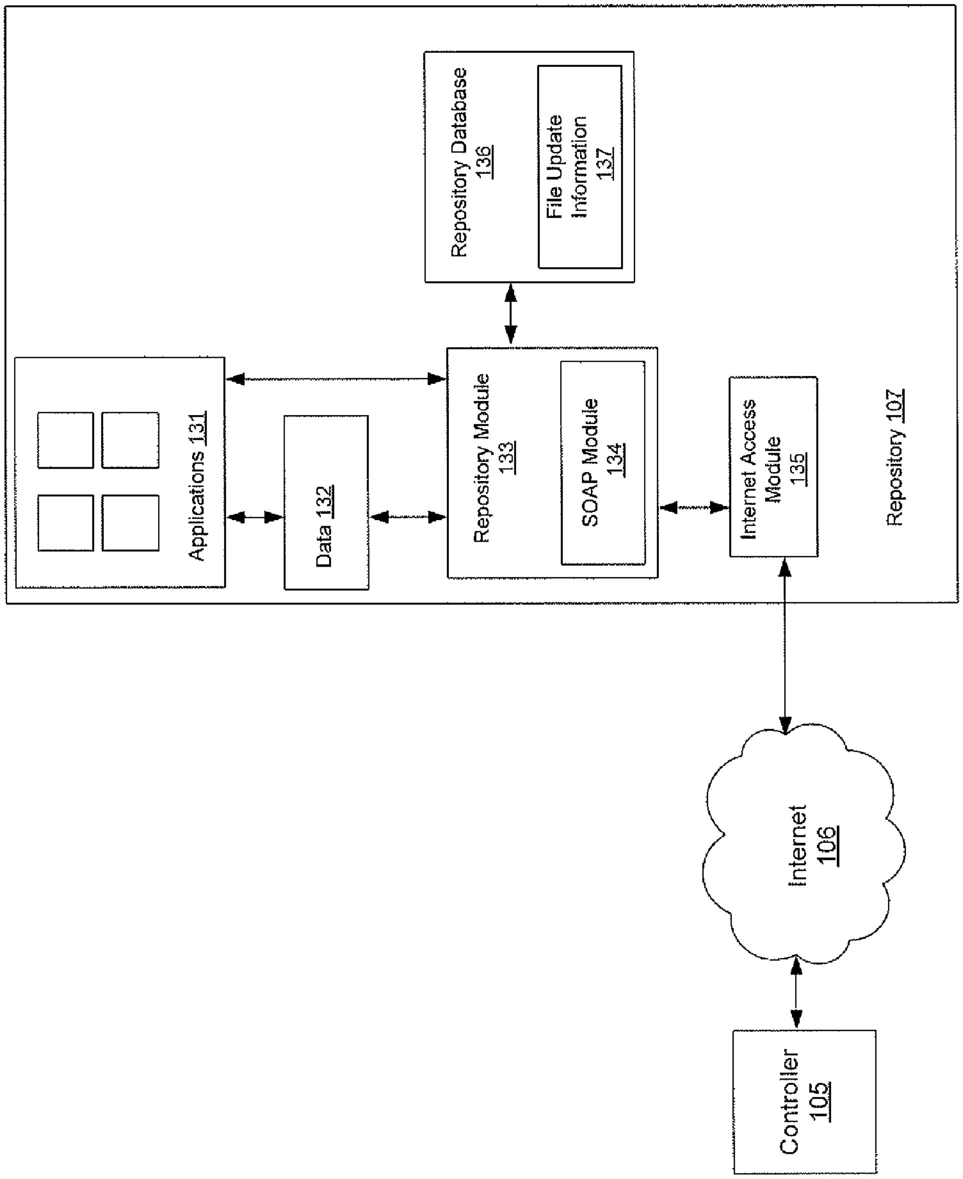
FIG. 4 is a more detailed diagram showing a repository, according to a first example embodiment of the invention.

FIG. 4 shows repository 107 in more detail. Repository 107 is a hardware device, such as, for example, a server, a personal computer, or a network attached storage device. Repository 107 is connected to a network (e.g., 106). In the first example embodiment, repository 107 is connected to the Internet (e.g., 106), but in other embodiments, repository 107 can be connected to, for example, an Intranet, a wireless network, a home network, or the like. Repository 107 includes a database 136 that stores file update information 137 including locations on the Internet of each file update. These locations are Universal Resource Locators (URL) on repository 107 or on other devices connected to Internet 106. The file update information also includes file installation information and file uninstall information. The file installation information includes information for retrieving and running an installation utility, and the file uninstall information includes information for retrieving and running an uninstall utility. Information indicating dependent files associated with the updates is also included in the file update information.

Repository 107 includes a processor coupled to a memory via a system bus. The processor is also coupled to external Input/Output (I/O) devices via the system bus and an I/O bus. A storage device having computer-readable media is coupled to the processor via a storage device controller and the I/O bus and the system bus. The storage device is used by the processor to store and read data 132 and program instructions used to implement the file update retrieval processes to be described below in the description of FIG. 5.

The repository's program instructions include program instructions for the database 136, program instructions for a repository module 133, program instructions for accessing the Internet (Internet Access Module 135), and program instructions for applications 131. The repository module 133 includes SOAP module 134 for communicating with controller 105 using SOAP. The repository module 133 processes update messages received from controller 105, determines upgradeable files currently installed on an agent device, checks for file updates for the upgradeable files, determines dependent files associated with the file updates, and generates update messages sent to controller 105.

The repository's processor may be further coupled to a user output device via a user output device controller coupled to the I/O bus. The repository's processor may be further coupled to a user input device via a user input device controller coupled to the I/O bus.

The repository's processor may be further coupled to a communications device via a communications device controller coupled to the I/O bus. The repository's processor may use the repository's communications device to communicate with a controller device (e.g., controller 105) for receiving file update requests and for transferring file update information. The repository's processor may use the communications device to communicate with a controller (e.g., 105) via a network (e.g., 106). In the first example embodiment, the network used by repository 107 to communicate with the controller (e.g., 105) is the Internet (e.g., 106), but in other embodiments, this network 106 can be, for example, an Intranet, a wireless network, a home network, or the like.

In operation, the repository's processor loads the repository's program instructions from the storage device into the repository's memory. The repository's processor executes the loaded program instructions to implement the file update retrieval processes to be described below.

Figure 5:
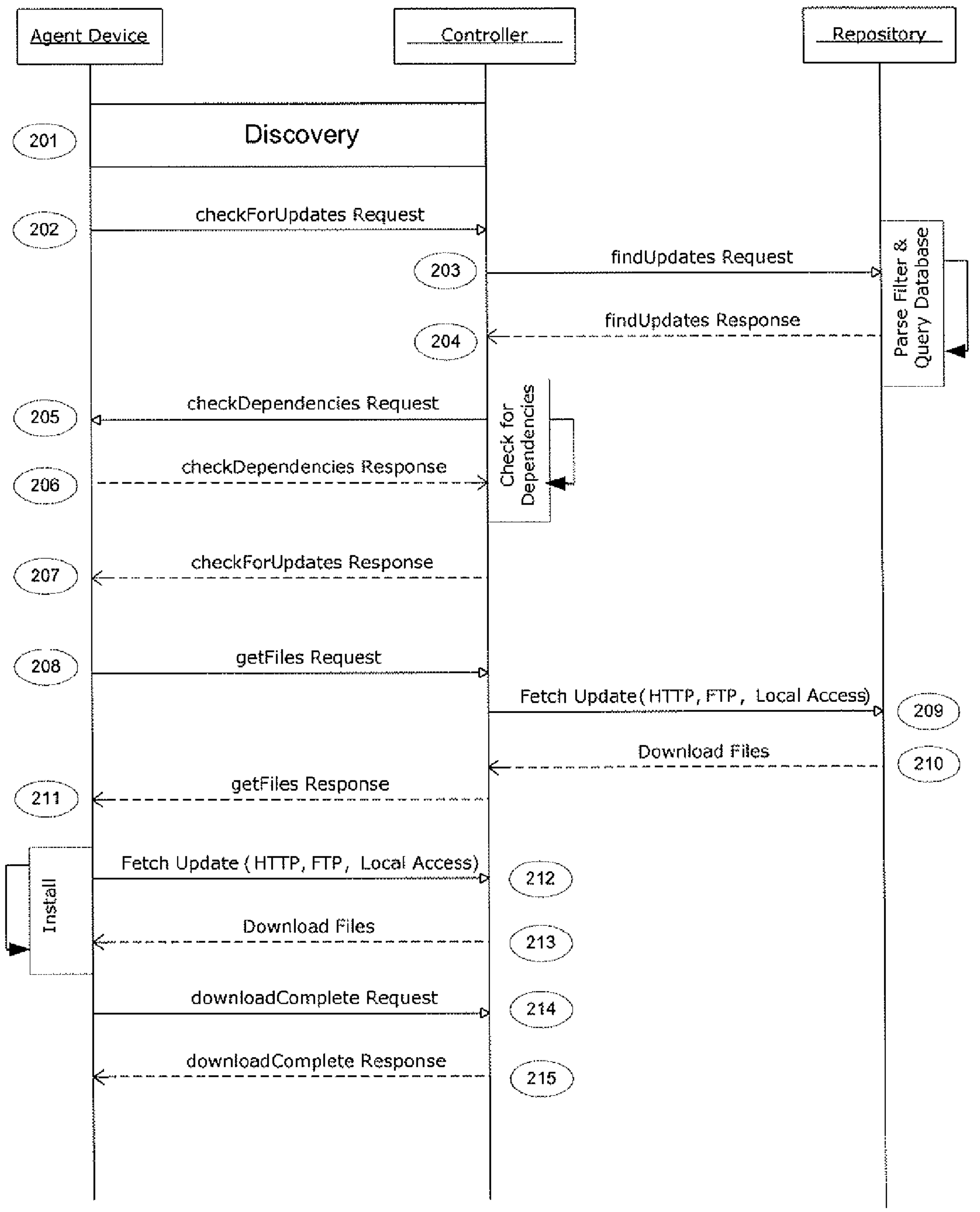
FIG. 5 is a sequence diagram illustrating the interaction between components of the file update system, according to the first example embodiment.

FIG. 5 is a sequence diagram illustrating the interaction between an agent device (e.g., 101 to 103), controller device 105, and repository 107 during a file update request. The agent device stores current state information indicating upgradeable files currently installed on the agent device. In addition, the current state information includes information about the software agent and the agent device. The current state information includes an agentInfo block, a deviceInfo block, and a fileList block. The agentInfo block includes a versionInfo block. The fileList block includes a fileInfo block for each upgradeable file installed on the agent device. Table 1 shows example current state information stored on the agent device.

TABLE 1

Current State Information Example

Current State Information

```
<agentInfo os=“Linux” processor=“MIPS”>
    <name>Canon Inc - Agent</name>
    <doCheckDependencies>true</doCheckDependencies>
    <versionInfo build=“Golden Master” minimumBuild=“Golden Master”>
        <major>1</major>
        <minor>0</minor>
        <revision>2</revision>
        <buildNo>2</buildNo>
    </versionInfo>
</agentInfo>
<deviceInfo>
        <name>Canon DSLR Professional Camera</name>
        <model>20D</model>
        <type>Digital SLR Camera</type>
    </deviceInfo>
<fileList>
    <fileInfo processor=“MIPS” type=“Application” os=“Linux”>
        <name>Very Fast Print Service</name>
        <description>Canon’s very fast print service.</description>
        <versionInfo build=“Golden Master” minimumBuild=“Golden Master”>
            <major>5</major>
            <minor>1</minor>
            <revision>1</revision>
            <buildNo>656</buildNo>
        </versionInfo>
    </fileInfo>
    <fileInfo processor=“MIPS” type=“Middleware” os=“Linux”>
        <name>UPnP Print Service</name>
        <description>Full UPnP version 1.1 support.</description>
        <versionInfo build=“Beta” minimumBuild=“Golden Master”>
            <major>0</major>
            <minor>10</minor>
            <revision>0</revision>
            <buildNo>210</buildNo>
        </versionInfo>
    </fileInfo>
    <fileInfo processor=“MIPS” type=“Driver” os=“Linux”>
        <name>IPv6 Network Procotol</name>
        <description>Canon IPv6 Network Protocol Support.</description>
        <versionInfo build=“Release Candidate” minimumBuild=“Golden Master”>
            <major>0</major>
            <minor>3</minor>
            <revision>5</revision>
            <buildNo>148</buildNo>
        </versionInfo>
    </fileInfo>
    <fileInfo processor=“MIPS” type=“Application” os=“Linux”>
          <name>Core PCL Print Module</name>
          <description>This is Canon’s very good PCL print module.</description>
          <versionInfo build=“Golden Master” minimumBuild=“Golden Master”>
            <major>1</major>
            <minor>0</minor>
            <revision>3</revision>
            <buildNo>98</buildNo>
          </versionInfo>
      </fileInfo>
      <fileInfo processor=“MIPS” type=“Driver” os=“Linux”>
          <name>IPv4 Network Protocol</name>
          <description>Canon IPv4 Network Protocol Support.</description>
          <versionInfo build=“Golden Master” minimumBuild=“Golden Master”>
            <major>3</major>
            <minor>1</minor>
            <revision>2</revision>
            <buildNo>23</buildNo>
          </versionInfo>
      </fileInfo>
</fileList>
```

The agentInfo block of the current state information contains information about the agent. Table 2 shows the example agentInfo block of the current state information of Table 1. Table 3 describes the elements and attributes included in the agentInfo block.

TABLE 2

| agentInfo Block Example<br>agentInfo Block |
|---|

```
<agentInfo os="Linux" processor="MIPS">
    <name>Canon Inc - Agent</name>
    <doCheckDependencies>true</doCheckDependencies>
    <versionInfo build="Golden Master" minimumBuild="Golden
    Master">
        <major>1</major>
        <minor>0</minor>
        <revision>2</revision>
        <buildNo>2</buildNo>
    </versionInfo>
</agentInfo>
```

TABLE 3 agentInfo Block Description

| Name | Type | Required | Description |
|---|---|---|---|
| os | attribute/osType | Yes | Describes the Operating System the Agent is running on. |
| processor | attribute/processorType | Yes | Agent's processor type |
| name | element/string | No | Agent name. |
| doCheckDependencies | element/Boolean | Yes | Indicates weather the Controller should send a checkDependencies message (at step 205) to the Agent. In many cases, the Agent does not have the resources to handle incoming SOAP messages or they don't want to check for dependent file. In these cases, doCheckDependencies is set to "false". |
| versionInfo | element/versionInfo Block | Yes | Agent software version information. |

The attribute "os" has the type "osType", which represents which operating system is running on the device. An example list of possible values for the "os" attribute is shown in Table 4.

TABLE 4

Enumeration osType Values

| Enumeration Value | Description |
|---|---|
| Linux | Linux operating system |
| MacOS | Macintosh OS X operating system |
| DOS | Microsoft DOS operating system |
| OS2 | IBM OS/2 operating system |
| UNIX | UNIX operating system |
| Windows CE | Windows CD operating system |
| Windows 3.x | Windows 3.x operating system |
| Windows 95 | Windows 95 operating system |
| Windows 98 | Windows 98 operating system |
| Windows 98 SE | Windows 98 SE operating system |
| Windows ME | Windows ME operating system |
| Windows MCE | Windows MCE operating system |
| Windows NT | Windows NT operating system |
| Windows 2000 | Windows 2000 operating system |
| Windows XP | Windows XP operating system |
| Windows 2003 | Windows 2003 operating system |
| Windows Vista | Windows Vista operating system |
| Win32 | Any Windows version of the operating system |
| Netware | Netware operating system |
| VxWorks | VxWorks embedded operating system |

TABLE 4-continued

Enumeration osType Values

| Enumeration Value | Description |
|---|---|
| Java | Java runtime environment |
| Java2ME | Java 2ME runtime environment |
| Java2SE | Java 2SE runtime environment |
| Chorus | Chorus operating system |
| OS Independent | Any operating system |

The attribute "processor" has the type "processorType", which represents the type of processor running on the device. An example list of possible values for the "processorType" attribute is shown in Table 5.

TABLE 5

Enumeration processorType Values

| Enumeration Value | Description |
|---|---|
| x86 | Intel processor - 32 bits |
| x64 | Intel processor - 64 bits |
| PPC | PowerPC processor |
| MIPS | MIPS processor |
| SH | SH processor |
| ARM | ARM processor |

The doCheckDependencies element is used by controller 105 to determine whether to generate and send a checkDependencies request message to the agent device (step 205) in response to controller 105 receiving a findUpdate response message from repository 107, as will be described below in the description of step 204.

The versionInfo block included in the agentInfo block specifies the version of the software agent. Table 6 shows the example versionInfo block included in the agentInfo block of Table 2. Table 7 describes the elements and attributes included in the versionInfo block.

TABLE 6 versionInfo Block Example
versionInfo Block

```
<versionInfo build="Golden Master" minimumBuild="Golden Master">
    <major>1</major>
    <minor>9</minor>
    <revision>2</revision>
    <buildNo>2</buildNo>
</versionInfo>
```

TABLE 7 versionInfo Block Description

| Name | Type | Required | Description |
|---|---|---|---|
| build | attribute/buildType | Yes | Build type of currently running file. |
| minimumBuild | attribute/buildType | Yes | Indicates the minimum requested file build type. The Repository will find the latest version of the file stored in the database with at least the value of minimumBuild. |
| major | element/int | Yes | Major version of file. This is the most significant value used to determine if a newer file is available. |
| minor | element/int | Yes | Minor version of file. This is the second most significant value used to determine if a newer file is available. |
| revision | element/int | Yes | Revision number of file. This is the third most significant value used to determine if a newer file is available. |
| buildNo | element/int | Yes | Build Number of file. This is the least significant value used to determine if a newer file is available. |

The attributes "build" and "minimumBuild" have the type "buildType", which identifies the quality of the file running on the device. An example list of possible values for the "build" and "minimumBuild" attributes is shown in Table 8.

TABLE 8

Enumeration buildType Values

| Enumeration Value | Description |
|---|---|
| Prototype | Prototype quality level |
| Pre-Alpha | Pre-Alpha file quality level |
| Alpha | Alpha file quality level |
| Beta | Beta file quality level |
| Release Candidate | Release Candidate file quality level |
| Golden Master | Golden Master file quality level |

The deviceInfo block of the current state information contains information about the agent device (e.g., 101 to 103). Table 9 shows the example deviceInfo block of the current state information of Table 1. Table 10 describes the elements and attributes included in the deviceInfo block.

TABLE 9 deviceInfoBlock Example
deviceInfo Block

```
<deviceInfo>
    <name>Canon DSLR Professional Camera</name>
    <model>20D</model>
    <type>Digital SLR Camera</type>
</deviceInfo>
```

TABLE 10 deviceInfoBlock Description

| Name | Type | Required | Description |
|---|---|---|---|
| name | element/string | No | Product name. |
| model | element/string | Yes | Product model. |
| type | element/string | Yes | Product type. |

The fileList block of the current state information indicates upgradeable files currently installed on the agent device (e.g., 101 to 103). For each upgradeable file, the fileList block includes a fileInfo block that contains information about the file. Table 11 shows one of the example fileInfo blocks included in the fileList block of the current state information of Table 1. Table 12 describes the elements and attributes included in the fileInfo block.

TABLE 11 fileInfo Block Example
fileInfo Block

```
<fileInfo processor="MIPS" type="Application" os="Linux">
    <name>Very Fast Print Service</name>
    <description>Canon's very fast print service.</description>
    <versionInfo build="Golden Master" minimumBuild="Golden
    Master">
        <major>5</major>
        <minor>1</minor>
        <revision>1</revision>
        <buildNo>656</buildNo>
    </versionInfo>
</fileInfo>
```

TABLE 12 fileInfo Block Description

| Name | Type | Required | Description |
|---|---|---|---|
| processor | attribute/processorType | Yes | File's processor type |
| type | attribute/fileType | Yes | File's type |
| OS | attribute/osType | Yes | Describes the Operating System the Agent is running on. |
| name | element/string | Yes | File name |
| description | element/string | Yes | File description |
| versionInfo | element/versionInfo Block | Yes | File's version information. |

The attribute "type" has the type "fileType", which represents the type of file running on the device. An example list of possible values for the "fileType" attribute is shown in Table 13.

TABLE 13

Enumeration fileType Values

| Enumeration Value | Description |
|---|---|
| Application | Application file |
| Driver | Driver file |
| Firmware | Firmware file |
| Middleware | Middleware file |
| Data | Data file |

At step 201, the agent device discovers controller 105 using the Simple Service Discovery Protocol (SSDP) protocol. In other embodiments, the agent device can use another protocol, such as, for example, Jini, Service Location Protocol (SLP) or Web Services Dynamic Discovery (WS-Discovery), to discover controller 105.

At step 202, the agent device selects installed upgradeable files for updating, generates a checkForUpdates request message requesting controller 105 to check for available updates for the selected upgradeable files, and then sends the checkForUpdates request message to controller 105.

In the first example embodiment, the software agent of the agent device automatically selects the upgradeable files for updating without additional user input. However, in other embodiments, the software agent can select the upgradeable files for updating based on user input received via a user interface (UI).

The checkForUpdates request message contains information about which installed upgradeable files the agent device is interested in updating. The checkForUpdates request message includes the agentInfo block and the deviceInfo block of the current state information, as well as a fileList block and an updateServiceInfo block. For each upgradeable file that the agent device is interested in updating, the fileList block includes the corresponding fileInfo block of the current state information. The updateServiceInfo block contains information about controller 105 discovered at step 201.

Table 14 shows an example updateServiceInfo block corresponding to controller 105 discovered at step 201. Table 15 describes the elements and attributes included in the updateServiceInfo block.

TABLE 14 updateServiceInfo Block Example
updateServiceInfo Block

```
<updateServiceInfo os="Linux" processor="MIPS">
    <name>CDA - Update Module</name>
    <versionInfo build="Golden Master" minimumBuild="Golden
    Master">
        <major>1</major>
        <minor>0</minor>
        <revision>1</revision>
        <buildNo>23</buildNo>
    </versionInfo>
</updateServiceInfo>
```

TABLE 15 updateServiceInfo Block Description

| Name | Type | Required | Description |
|---|---|---|---|
| os | attribute/osType | Yes | Describes the Operating System the Agent is running on. |
| processor | attribute/ processorType | Yes | Controller's processor type |
| name | element/string | No | Update Service name. |
| versionInfo | element/ versionInfo Block | Yes | Update Service's software version information. |

The versionInfo block included in the updateServiceInfo block specifies the version of the update service provided by controller 105, and is described above in Table 7.

Table 16 shows an example checkForUpdates request message generated by an agent device. The checkForUpdates request message shown in Table 16 is generated by an agent device storing the current state information of Table 1 that has selected to update the "Very Fast Print Service", "UPnP Print Service", and "IPv6 Network Protocol" files installed on the agent device. This checkForUpdates request message includes the controller information of Table 14, received during discovery step 201.

TABLE 16 checkForUpdates Request Message Example
checkForUpdates Request Message

```
<?xml version="1.0" encoding="utf-8"?>
<checkForUpdates xmlns="http://www.canon.com/ns/pf/caums/2006/1.0">
    <agentInfo os="Linux" processor="MIPS">
        <name>Canon Inc - Agent</name>
        <doCheckDependencies>true</doCheckDependencies>
        <versionInfo build="Golden Master" minimumBuild="Golden Master">
            <major>1</major>
            <minor>0</minor>
            <revision>2</revision>
            <buildNo>2</buildNo>
        </versionInfo>
    </agentInfo>
    <updateServiceInfo os="Linux" processor="MIPS">
        <name>CDA - Update Module</name>
        <versionInfo build="Golden Master" minimumBuild="Golden Master">
            <major>1</major>
            <minor>0</minor>
            <revision>1</revision>
            <buildNo>23</buildNo>
        </versionInfo>
```

TABLE 16-continued checkForUpdates Request Message Example
checkForUpdates Request Message

```
    </updateServiceInfo>
    <deviceInfo>
        <name>Canon DSLR Professional Camera</name>
        <model>20D</model>
        <type>Digital SLR Camera</type>
    </deviceInfo>
    <fileList>
        <fileInfo processor="MIPS" type="Application" os="Linux">
            <name>Very Fast Print Service</name>
            <description>Canon's very fast print service.</description>
            <versionInfo build="Golden Master" minimumBuild="Golden Master">
                <major>5</major>
                <minor>1</minor>
                <revision>1</revision>
                <bulidNo>656</buildNo>
            </versionInfo>
        </fileInfo>
        <fileInfo processor="MIPS" type="Middleware" os="Linux">
            <name>UPnP Print Service</name>
            <description>Full UPnP version 1.1 support.</description>
            <versionInfo build="Beta" minimumBuild="Golden Master">
                <major>0</major>
                <minor>10</minor>
                <revision>0</revision>
                <bulidNo>210</buildNo>
            </versionInfo>
        </fileInfo>
        <fileInfo processor="MIPS" type="Driver" os="Linux">
            <name>IPv6 Network Procotol</name>
            <description>Canon IPv6 Network Protocol Support.</description>
            <versionInfo build="Release Candidate" minimumBuild="Golden Master">
                <major>0</major>
                <minor>3</minor>
                <revision>5</revision>
                <buildNo>148</buildNo>
            </versionInfo>
        </fileInfo>
    </fileList>
</checkForUpdates>
```

As shown in Table 16, the agent device sends the checkForUpdates request message to request updates for the "Very Fast Print Service", "UPnP Print Service", and "IPv6 Network Protocol" files installed on the agent device. In this request, updates for the "Core PCL Print Module" and the "IPv4 Network Protocol", which are also installed on the agent device (as specified by the current state information of Table 1), are not requested.

At step 203, controller 105 generates and sends a findUpdates request message to repository 107, in response to receiving the checkForUpdates request message from the agent device. The findUpdates request message requests repository 107 to check for file updates for the files listed in the fileList block of the checkForUpdates request message received from the agent device. The information contained in the findUpdates request message provides repository 107 with information to query the repository's database and to determine if any file updates are available. The findUpdates request message includes the information contained in the updateServiceInfo, deviceInfo, and fileList blocks included in the checkForUpdates request message received from the agent device. Table 17 shows an example findUpdates request message sent in response to controller 105 receiving the checkForUpdates request message of Table 16.

TABLE 17 findUpdates Request Message Example
findUpdates Request Message

```
<?xml version="1.0" encoding="utf-8"?>
<findUpdates xmlns="http://www.canon.com/ns/pf/caums/2006/1.0/">
    <updateServiceInfo os="Linux" processor="MIPS">
        <name>CDA - Update Module</name>
        <versionInfo build="Golden Master" minimumBuild="Golden Master">
            <major>1</major>
            <minor>0</minor>
            <revision>1</revision>
            <buildNo>23</buildNo>
        </versionInfo>
    </updateServiceInfo>
    <deviceInfo>
        <name>Canon DSLR Professional Camera</name>
        <model>20D</model>
```

TABLE 17-continued findUpdates Request Message Example
findUpdates Request Message

```
        <type>Digital SLR Camera</type>
    </deviceInfo>
    <fileList>
        <fileInfo processor="MIPS" type="Application" os="Linux">
            <name>Very Fast Print Service</name>
            <description>Canon's very fast print service.</description>
            <versionInfo build="Golden Master" minimumBuild="Golden Master">
                <major>5</major>
                <minor>1</minor>
                <revision>1</revision>
                <buildNo>656</buildNo>
            </versionInfo>
        </fileInfo>
        <fileInfo processor="MIPS" type="Middleware" os="Linux">
            <name>UPnP Print Service</name>
            <description>Full UPnP version 1.1 support.</description>
            <versionInfo build="Beta" minimumBuild="Golden Master">
                <major>0</major>
                <minor>10</minor>
                <revision>0</revision>
                <buildNo>210</buildNo>
            </versionInfo>
        </fileInfo>
        <fileInfo processor="MIPS" type="Driver" os="Linux">
            <name>IPv6 Network Procotol</name>
            <description>Canon IPv6 Network Protocol Support.</description>
            <versionInfo build="Release Candidate" minimumBuild="Golden Master">
                <major>0</major>
                <minor>3</minor>
                <revision>5</revision>
                <buildNo>148</buildNo>
            </versionInfo>
        </fileInfo>
    </fileList>
</findUpdates>
```

As shown in Table 17, the findUpdates request message includes the updateServiceInfo, deviceInfo, and fileList blocks of the received checkForUpdates request message shown in Table 16.

At step 204, repository 107 receives the findUpdates request message from controller 105, and determines upgradeable files currently installed on the agent device based on the current state information contained in the fileList block of the findUpdates request message. After determining the upgradeable files installed on the agent device, repository 107 checks for file updates for the determined upgradeable files.

In the first example embodiment, repository 107 parses the fileInfo blocks included in the fileList block to extract the name, description, file type, target operating system, target processor, and version information for each upgradeable file. For each upgradeable file, repository 107 queries the repository's database to find file update information for the latest update for the upgradeable file. Repository 107 queries the database to find file update information for a file update whose name, description, file type, target operating system, and target processor information match the name, description, file type, target operating system, and target processor information of the upgradeable file, and that has a build of a quality greater than or equal to the build quality of the upgradeable file.

The minimum build type is specified by the minimumBuild attribute of the versionInfo block included in the fileInfo block associated with an upgradeable file. The result of the query provides information for the latest version of the file update with at least the value of minimumBuild. In the first example embodiment, the possible values for minimumBuild in order of increasing build quality are as follows: "Prototype", "Pre-Alpha", "Alpha", "Beta", "Release Candidate", and "Golden Master".

Tables 18 to 20 are used to illustrate an example of how the value of minimumBuild is used to compute the query result.

TABLE 18

Example Stored File Update Versions

| Release | build | Version (major.minor.revision.buildNo) |
|---|---|---|
| 1 | Golden Master | 1.0.0.65 |
| 2 | Pre-Alpha | 1.0.1.24 |
| 3 | Alpha | 1.0.3.76 |
| 4 | Beta | 1.1.0.15 |
| 5 | Golden Master | 2.0.0.235 |
| 6 | Alpha | 2.0.1.23 |
| 7 | Golden Master | 3.0.2.98 |
| 8 | Beta | 3.0.1.82 |

Golden Master is the build of the formal release, and the build order for the builds listed in Table 18 is as follows: "Pre-Alpha", "Alpha", "Beta", and "Golden Master". In a first example, repository 107 stores information for the "Very Fast Print Service" file update versions shown in Table 18 in its database, and the minimumBuild of the "Very Fast Print Service" file installed on the agent device is "Golden Master", as shown in Table 19.

TABLE 19

First Example Installed File Versions

```
<versionInfo build="Golden Master" minimumBuild="Golden Master">
    <major>1</major>
    <minor>0</minor>
    <revision>0</revision>
    <bulidNo>65</buildNo>
</versionInfo>
```

Since the minimumBuild of the "Very Fast Print Service" file installed on the agent device is "Golden Master", as shown in Table 19, then information for the Golden Master version of the update file (i.e., Release 7 of Table 18) is included in the query result.

In a second example, repository 107 stores information for the "Very Fast Print Service" file update versions shown in Table 18 in its database, and the minimumBuild of the "Very Fast Print Service" file installed on the agent device is "Alpha", as shown in Table 20.

TABLE 20

Second Example Installed File Versions

```
<versionInfo build="Golden Master" minimumBuild="Alpha">
    <major>1</major>
    <minor>0</minor>
    <revision>0</revision>
```

TABLE 20-continued

Second Example Installed File Versions

```
    <buildNo>65</buildNo>
</versionInfo>
```

Since the minimumBuild of the "Very Fast Print Service" file installed on the agent device is "Alpha", as shown in Table 20, information for the latest update version having a build quality greater than "Alpha" (i.e., Release 8 of Table 18) is included in the query result.

The file update information included in the query result includes locations on the Internet for each file update. In the first example embodiment, the file update locations are Universal Resource Locators (URL). These file locations include locations on devices connected to the Internet, such as, for example, repository 107, or any other device connected to the Internet. Information indicating dependent files associated with the updates is also included in the file update information.

Table 21 shows example file update information. The information shown in Table 21 is associated with a file update for an upgradeable file specified in one of the example fileInfo blocks included in the findUpdates request message of Table 17. As shown in Table 21, the information indicating the dependent files is included in a dependencyList block, and the remaining file update information is included in an updateInfo block.

TABLE 21

File Update Information Example
File Update Information

```
<updateInfo hasDependency="true">
    <id>abcd-efgh-ijkl-mnop</id>
    <dateTimeStamp>1161119217</dateTimeStamp>
    <versionInfo build="Golden Master" minimumBuild="Golden Master">
        <major>5</major>
        <minor>2</minor>
        <revision>0</revision>
        <buildNo>15</buildNo>
    </versionInfo>
    <installInfo>
        <fileName>PrinterService.msi</fileName>
        <fileSize>15689</fileSize>
        <locationURI>http://update.canon.com/updates/dkdfjeife239f3uo</locationURI>
        <commandLine>PrinterService.msi -i</commandLine>
    </installInfo>
    <uninstallInfo>
        <fileName>PrinterService__Uninstall.msi</fileName>
        <fileSize>25598</fileSize>
        <locationURI>http://update.canon.com/updates/view.php&id=324645</locationURI>
        <commandLine>PrinterService__Uninstall.msi -u</commandLine>
    </uninstallInfo>
</updateInfo>
<dependencyList>
        <DependencyInfo processor="MIPS" type="Application" os="Linux">
            <name>Core PCL Print Module</name>
            <descriprion>This is Canon's very good PCL print module.</description>
            <updateInfo hasDependency="false">
                <id>aaaa-11111-bbbb-2222</id>
                <dateTimeStamp>1161119214</dateTimeStamp>
                <versionInfo build="Golden Master" minimumBuild="Golden Master">
                    <major>1</major>
                    <minor>1</minor>
                    <revision>5</revision>
                    <bulidNo>111</buildNo>
                </versionInfo>
                <installInfo>
                    <fileName>PCLcore.msi</fileName>
                    <fileSize>15229</fileSize>
                    <locationURI>http://update.canon.com/updates/ddsfres-usdrive-
```

TABLE 21-continued

File Update Information Example
File Update Information

```
pclcsde</locationURI>
                    <commandLine>PCLcore.msi -i</commandLine>
                 </installInfo>
                <uninstallInfo>
                <fileName>PCLcore__Uninstall.msi</fileName>
                    <fileSize>11598</fileSize>
                    <locationURI>http://update.canon.com/updates/ddsfres-usdrive-
pclcsde</locationURI>
                    <commandLine>PCLcore__Uninstall.msi -u</commandLine>
                </uninstallInfo>
            </updateInfo>
        </DependencyInfo>
</dependencyList>
```

Table 22 describes the elements and attributes included in the updateInfo block.

TABLE 22 updateInfo Block Description

| Name | Type | Required | Description |
|---|---|---|---|
| hasDependency | attribute/boolean | Yes | true = dependent file is available<br>false = no dependent file is available |
| id | element//string | Yes | Unique file identifier. |
| dateTimeStamp | element/dateTmeStamp | Yes | Timestamp of file |
| versionInfo | element/versionInfo Block | Yes | File Update version information |
| installInfo | element/installInfo Block | Yes | Contains information on what, where, and how to install the file update. |
| uninstallInfo | element/uninstallInfo Block | Yes | Contains information on what, where, and how to uninstall the file update. |

The versionInfo block included in the updateInfo block of the file update information specifies the version of the corresponding file update discovered by repository 107, and is described above in Table 7.

The installInfo block included in the updateInfo block of the file update information includes information for retrieving and running an installation utility. The uninstallInfo block included in the updateInfo block of the file update information includes information for retrieving and running an uninstall utility.

Table 23 shows the example installInfo shown in Table 21. Table 24 describes the elements and attributes included in the installInfo block.

TABLE 23 installInfo Block Example installInfo Block

```
<installInfo>
    <fileName>PrinterService.msi</fileName>
    <fileSize>15689</fileSize>
    <locationURI>http://update.canon.com/updates/
    dkdfjeife239f3uo</locationURI>
    <commandLine>PrinterService.msi -i</commandLine>
</installInfo>
```

TABLE 24 installInfo Block Description

| Name | Type | Required | Description |
|---|---|---|---|
| fileName | element/string | Yes | File name of the file update. |
| fileSize | element/int | Yes | Size in bytes of file update |
| locationURI | element/string | Yes | Location URI of file update |
| commandLine | element/string | Yes | Command line to execute an install script or an install program with optional arguments. |

In the first example embodiment, the locationURI element of the installInfo block specifies the URL identifying the location of the installation utility specified by the fileName element, and the commandLine element of the installInfo block contains command-line instructions for executing the installation utility. In the example shown in Table 23, the installation utility specified by the fileName element (i.e., “PrinterService.msi”) is an executable Microsoft Installer (MSI) installation utility that contains the file update. The commandLine element shown in Table 23 specifies how to execute the MSI installation utility to install the file update contained in PrinterService.msi using a command line interface. As shown in Table 23, the MSI installation utility is to be executed via the command line with the “-i” argument.

Table 25 shows the example uninstallInfo shown in Table 21. Table 26 describes the elements and attributes included in the uninstallInfo block.

TABLE 25 uninstallInfo Block Example
uninstallInfo Block

```
<uninstallInfo>
    <fileName>PrinterService__Uninstall.msi</fileName>
    <fileSize>25598</fileSize>
    <locationURI>http://update.canon.com/updates/view.php&id=
    324645</locationURI>
    <commandLine>PrinterService__Uninstall.msi -u</commandLine>
</uninstallInfo>
```

TABLE 26 uninstallInfo Block Description

| Name | Type | Required | Description |
|---|---|---|---|
| fileName | element/string | Yes | File name of the file update. |
| fileSize | element/int | Yes | Size in bytes of file update |
| locationURI | element/string | Yes | Location URI of file update |
| commandLine | element/string | Yes | Command line to execute an uninstall script or an uninstall program with optional arguments. |

The locationURI element of the uninstallInfo block specifies the URL identifying the location of the uninstall utility specified by the fileName element. The commandLine element of the uninstallInfo block contains command-line instructions for removing the file update (installed by the installation utility specified by the fileName element of the corresponding installInfo block) using the uninstall utility. In the example shown in Table 25, the file specified by the fileName element (i.e., "PrinterService_Uninstall.msi") is an executable Microsoft Installer (MSI) uninstall utility that removes the file update installed by the installation utility specified by the fileName element of the installInfo block (i.e., "PrinterService.msi"). The commandLine element shown in Table 25 specifies how to execute the MSI uninstall utility to remove the file update contained in PrinterService.msi using a command line interface. As shown in Table 25, the MSI uninstall utility is to be executed via the command line with the "-u" argument.

The dependencyList block includes a DependencyInfo block for each dependent file. Each DependencyInfo block includes "processor", "type", and "OS" attributes, and "name" and "description" elements. Each DependencyInfo block also includes an updateInfo block. The updateInfo block is described above in Table 22. The "processor", "type", and "OS" attributes, and "name" and "description" elements are described above in Table 12. Tables 4, 5, and 13 enumerate values for the "OS", "processor" and "type" attributes, respectively.

In the first example embodiment, the file update information is setup and managed at the repository by an administrator. The administrator uses an administration user interface, such as, for example, a graphical user interface (GUI), a command-line interface, or the like, to manage the repository. In other example embodiments, the repository can automatically setup and manage the file update information.

If the result of performing the query indicates that a file update is available for the upgradeable file, then repository 107 determines whether the file update is newer than the upgradeable file listed in the fileList block of the received findUpdates request message. Repository 107 makes this determination by comparing the version information extracted from the corresponding fileInfo block's versionInfo block with the version information included in the file update information stored in the repository's database, as will be described below for FIG. 6.

In the first example embodiment, repository 107 also checks for a file update for the update service installed on controller 105. Repository 107 checks for a file update for the update service in a similar manner as it checks for file updates for upgradeable files included in the fileList block of the findUpdates request message. More specifically, repository 107 parses the updateServiceInfo block included in the findUpdates request message to extract the name, target operating system, target processor, and version information for the update service. Repository 107 uses the name, target operating system, target processor information, and minimum build type extracted from the corresponding updateServiceInfo block to query the repository's database for information for the latest file update for the update service. If the result of performing the query indicates that a file update is available for the update service, then repository 107 determines whether the file update is newer than the update service listed in the updateServiceInfo block of the received findUpdates request message. Repository 107 makes this determination by comparing the version information extracted from the corresponding updateServiceInfo block's versionInfo block with the version information included in the file update information stored in the repository's database, as will be described below for FIG. 6.

After determining whether newer file updates exist for each of the upgradeable files listed in the fileList block of the received findUpdates request message, repository 107 generates a findUpdates response message, and sends the findUpdates response message to controller 105. The findUpdates response message contains the file update information for the discovered file updates, as well as any file update information for the update service running on controller 105.

The order in which the files are listed in the findUpdates response message determines the order in which the agent device installs the file updates, as will be described below for step 213. This order is determined by repository 107.

Table 27 shows an example findUpdates response message generated in response to repository 107 receiving the findUpdates request message of Table 17.

TABLE 27 findUpdates Response Message Example
findUpdates Response Message

```
<?xml version="1.0" encoding="utf-8"?>
<findUpdatesResponse xmlns="http://www.canon.com/ns/pf/caums/2006/1.0/">
    <updateserviceinfo os="Linux" processor="MIPS">
        <name>CDA - Update Module</name>
        <versionInfo build="Golden Master" minimumBuild="Golden Master">
            <major>1</major>
            <minor>0</minor>
            <revision>1</revision>
```

TABLE 27-continued findUpdates Response Message Example
findUpdates Response Message

```
            <buildNo>23</buildNo>
        </versionInfo>
        <updateInfo hasDependency="false">
            <id>1111-2222-3333-4444</id>
            <dateTimeStamp>1161119217</dateTimeStamp>
            <versionInfo build="Golden Master" minimumBuild="Golden Master">
                <major>2</major>
                <minor>0</minor>
                <revision>0</revision>
                <buildNo>1</buildNo>
            </versionInfo>
            <installInfo>
                <fileName>UpdateService.msi</fileName>
                <fileSize>236549</fileSize>
                <locationURI>http://update.canon.com/updates/1234kDva23fQDfd345GADVd</locationURI>
                <commandLine>UpdateService.msi -i</commandLine>
            </installInfo>
            <uninstallInfo>
                <fileName>UpdateService.msi</fileName>
                <fileSize>236436</fileSize>
                <locationURI>http://update.canon.com/updates/1234kDva23fQDfd34lkfdj4i4</locationURI>
                <commandLine>UpdateService.msi -i</commandLine>
            </uninstallInfo>
        </updateInfo>
    </updateServiceInfo>
    <fileList>
        <fileInfo processor="MIPS" type="Application" isUpdateAvailable="true" os="Linux">
            <name>Very Fast Print Service</name>
            <description>Canon's very fast print service.</description>
            <versionInfo build="Golden Master" minimumBuild="Golden Master">
                <major>5</major>
                <minor>1</minor>
                <revision>1</revision>
                <buildNo>656</buildNo>
            </versionInfo>
            <updateInfo hasDependency="true">
                <id>abcd-efgh-ijkl-mnop</id>
                <dateTimeStamp>1161119217</dateTimeStamp>
                    <versionInfo build="Golden Master" minimumBuild="Golden Master">
                        <major>5</major>
                        <minor>2</minor>
                        <revision>0</revision>
                        <buildNo>15</buildNo>
                    </versionInfo>
                    <installInfo>
                        <fileName>PrinterService.msi</fileName>
                        <fileSize>15689</fileSize>
                        <locationURI>http://update.canon.com/updates/dkdfjeife239f3uo</locationURI>
                        <commandLine>PrinterService.msi -i</commandLine>
                    </installInfo>
                    <uninstallInfo>
                        <fileName>PrinterService__Uninstall.msi</fileName>
                        <fileSize>25598</fileSize>
                        <locationURI>http://update.canon.com/updates/view.php&id=324645</locationURI>
                        <commandLine>PrinterService__Uninstall.msi -u</commandLine>
                    </uninstallInfo>
            </updateInfo>
            <dependencyList>
                <DependencyInfo processor="MIPS" type="Application" os="Linux">
                    <name>Core PCL Print Module</name>
                    <description>This is Canon's very good PCL print module.</description>
                    <updateInfo hasDependency="false">
                         <id>aaaa-11111-bbbb-2222</id>
                         <dateTimeStamp>1161119214</dateTimeStamp>
                        <versionInfo build="Golden Master" minimumBuild="Golden Master">
                            <major>1</major>
                            <minor>1</minor>
                            <revision>5</revision>
                            <buildNo>111</buildNo>
                        </versionInfo>
                         <installInfo>
                            <fileName>PCLcore.msi</fileName>
                            <fileSize>15229</fileSize>
                            <locationURI>http://update.canon.com/updates/ddsfres-usdrive-
pclcsde</locationURI>
                                <commandLine>PCLcore.msi -i</commandLine>
                        </installInfo>
```

TABLE 27-continued findUpdates Response Message Example
findUpdates Response Message

```
                    <uninstallInfo>
                        <fileName>PCLcore__Uninstall.msi</fileName>
                        <fileSize>11598</fileSize>
                        <locationURI>http://update.canon.com/updates/ddsfres-usdrive-pclcsde</locationURI>
                        <commandLine>PCLcore__Uninstall.msi -u</commandLine>
                    </uninstallInfo>
                </updateInfo>
            </DependencyInfo>
        </dependencyList>
    </fileInfo>
    <fileInfo processor="MIPS" type="Middleware" isUpdateAvailable="false" os="Linux">
        <name>UPnP Print Service</name>
        <description>Full UPnP version 1.1 support.</description>
        <versionInfo build="Beta" minimumBuild="Golden Master">
            <major>0</major>
            <minor>10</minor>
            <revision>0</revision>
            <buildNo>210</buildNo>
        </versionInfo>
    </fileInfo>
    <fileInfo processor="MIPS" type="Driver" isUpdateAvailable="true" os="Linux">
        <name>IPv6 Network Procotol</name>
        <description>Canon IPv6 Network Protocol Support.</description>
        <versionInfo build="Release Candidate" minimumBuild="Golden Master">
            <major>0</major>
            <minor>3</minor>
            <revision>5</revision>
            <buildNo>148</buildNo>
        </versionInfo>
        <UpdateInfo hasDependency="true">
            <id>wwww-rrrr-tttt-yyyy</id>
            <dateTimeStamp>1161119217</dateTimeStamp>
            <versionInfo build="Golden Master" minimumBuild="Golden Master">
                <major>1</major>
                <minor>0</minor>
                <revision>0</revision>
                <buildNo>215</buildNo>
            </versionInfo>
            <installInfo>
                <fileName>NetworkDriver.exe</fileName>
                <fileSize>1598632</fileSize>
                <locationURI>http://update.canon.com/updates/kdsfjsm-234r09k</locationURI>
                <commandLine>NetworkDriver.exe -i</commandLine>
            </installInfo>
            <uninstallInfo>
                <fileName>NetworkDriver__Uninstall.exe</fileName>
                <fileSize>1598583</fileSize>
                <locationURI>http://update.canon.com/updates/kdsfjsm-234kji8</locationURI>
                <commandLine>NetworkDriver__Uninstall.exe -u</commandLine>
            </uninstallInfo>
        </updateInfo>
        <dependencyList>
            <DependencyInfo processor="MIPS" type="Driver" os="Linux">
                <name>IPv4 Network Procotol</name>
                <description>Canon IPv4 Network Protocol Support.</description>
                <updateInfo hasDependency="false">
                    <id>dddd-33311-eeee-4444</id>
                    <dateTimeStamp>1311119214</dateTimeStamp>
                    <versionInfo build="Golden Master" minimumBuild="Golden Master">
                        <major>3</major>
                        <minor>1</minor>
                        <revision>2</revision>
                        <buildNo>23</buildNo>
                    </versionInfo>
                    <installInfo>
                        <fileName>IPv4Driver.msi</fileName>
                        <fileSize>23229</fileSize>
                        <locationURI>http://update.canon.com/updates/ddsfres-usdrive-ipv4sde</locationURI>
                        <commandLine>IPv4Driver.msi -i</commandLine>
                    </installInfo>
                    <uninstallInfo>
                        <fileName>IPv4Driver__Uninstall.msi</fileName>
                        <fileSize>11598</fileSize>
                        <locationURI>http://update.canon.com/updates/ddsfres-usdrive-
```

TABLE 27-continued findUpdates Response Message Example
findUpdates Response Message

```
ipv4sde</locationURI>
                        <commandLine>IPv4Driver__Uninstall.msi -u</commandLine>
                    </uninstallInfo>
                </updateInfo>
            </DependencyInfo>
        </dependencyList>
    </fileInfo>
  </fileList>
</findUpdatesResponse>
```

As shown in Table 27, the findUpdates response message generated by repository 107 includes an updateServiceInfo block and a fileList block. The updateServiceInfo block of the findUpdates response message contains the information included in the updateServiceInfo block of the findUpdates request message received from controller 105. If a file update is available for the update service installed on controller 105, repository 107 adds the file update information for the file update to the updateServiceInfo block of the findUpdates response message. Any dependent files associated with the file update are included in a dependencyList block of the updateServiceInfo block, and the remaining file update information is included in an updateInfo block of the updateServiceInfo block.

The fileList block of the findUpdates response message contains the information included in the fileList block of the findUpdates request message received from controller 105. Each fileInfo block included in the fileList block generated by repository 107 includes an isUpdateAvailable Boolean attribute that indicates whether a file update is available. If a file update is not available for an upgradeable file identified in a fileInfo block, then repository 107 sets the isUpdateAvailable attribute for that fileInfo block to "false". If a file update is available for an upgradeable file identified in a fileInfo block, then repository 107 sets the isUpdateAvailable attribute for that fileInfo block to "true", and adds file update information for the file update to the fileInfo block. Any dependent files associated with the file update are included in a dependencyList block of the fileInfo block, and the remaining file update information is included in an updateInfo block of the fileInfo block.

After controller 105 receives the findUpdates response message from repository 107, it determines whether to send a checkDependencies request message to the agent device (step 205) or send a checkForUpdates response message to the agent device (step 207). If the value of doCheckDependencies included in the agentInfo block of the checkForUpdates request message is "false", then controller 105 generates and sends a checkForUpdates response message to the agent device (step 207). If the value of doCheckDependencies is "true", then controller 105 determines whether the file update information contained in the findUpdates response message received from repository 107 indicates that dependent files are associated with the available file updates. If the file update information contained in the received findUpdates response message indicates that dependent files are not associated with the available file updates, then controller 105 generates and sends a checkForUpdates response message to the agent device (step 207).

If the file update information contained in the received findUpdates response message indicates that dependent files are associated with the available file updates, then controller 105 generates and sends a checkDependencies request message to the agent device (step 205).

For example, if the agent sends the checkForUpdates request message shown in Table 16 to controller 105, and repository 107 sends the findUpdates response message shown in Table 27, then controller 105 generates and sends a checkDependencies request message to the agent device (step 205).

The checkDependencies request message requests the agent device to check to see if the dependent files associated with the available file updates are already installed on the agent device. The checkDependencies request message includes the information contained in the dependencyList blocks included in the fileList block of the findUpdates response message received from repository 107. The information for each dependent file is contained in a fileInfo block.

Table 28 shows an example checkDependencies request message sent in response to controller 105 receiving the findUpdates response message of Table 27.

TABLE 28 checkDependencies Request Message Example
checkDependencies Request Message

```
<?xml version="1.0" encoding="utf-8"?>
<checkDependencies xmlns="http://www.canon.com/ns/pf/caums/2006/
1.0/">
  <fileList>
    <fileInfo processor="MIPS" type="Application" os="Linux">
      <name>Core PCL Print Module</name>
      <description>This is Canon's very good PCL print
      module.</description>
      <versionInfo build="Golden Master"
      minimumBuild="Golden Master">
        <major>1</major>
        <minor>1</minor>
        <revision>5</revision>
        <buildNo>111</buildNo>
      </versionInfo>
    </fileInfo>
    <fileInfo processor="MIPS" type="Driver" os="Linux">
      <name>IPv4 Network Protocol</name>
      <description>Canon IPv4 Network Protocol
      Support.</description>
      <versionInfo build="Golden Master"
      minimumBuild="Golden Master">
        <major>3</major>
        <minor>1</minor>
        <revision>2</revision>
        <buildNo>23</buildNo>
      </versionInfo>
    </fileInfo>
  </fileList>
</checkDependencies>
```

In response to receiving the checkDependencies request message from controller 105, the agent device determines which, if any, dependent files are installed on the agent device by determining whether information for any of the dependent files specified in the fileInfo blocks of the checkDependencies request message are included in the current state information stored on the agent device. For each dependent file specified in the checkDependencies request message, the agent device determines whether information for the dependent file is included in the current state information by searching for a fileInfo block included in the current state information whose name element, and processor, type and operating system attributes match the name element, and processor, type and operating system attributes of the dependent file. If a match is found, then a version of the dependent filed is already installed on the agent device. After determining which, if any, dependent files are installed on the agent device, the agent device generates and sends a checkDependencies response message to controller 105 (step 206). For each dependent file installed on the agent device, the agent device adds the corresponding fileInfo block included in the current state information to the checkDependencies response message. If no dependent files are installed on the agent device, then no fileInfo blocks are added to the checkDependencies response message.

For example, if the agent device stores the current state information of Table 1 and receives the checkDependencies request message of Table 28, the agent device determines that versions of the "Core PCL Print Module" and the "IPv4 Network Protocol" dependent files specified in the checkDependencies request message are already installed on the agent device because the current state information includes fileInfo blocks for both of these dependent files. While the version of the "IPv4 Network Protocol" file is the same as the version specified in the checkDependencies request message, the version of the "Core PCL Print Module" file installed on the agent device is older than the version specified in the checkDependencies request message. After determining that versions of both dependent files are installed on the agent device, the agent device generates the checkDependencies response message shown in Table 29, which contains the fileInfo blocks for the versions of these installed files, as specified by the current state information of Table 1.

TABLE 29 checkDependencies Response Message Example
checkDependencies Response Message

```
<?xml version="1.0" encoding="utf-8"?>
<checkDependenciesResponse xmlns="http://www.canon.com/ns/pf/
caums/2006/1.0/">
    <fileList>
```

TABLE 29-continued checkDependencies Response Message Example
checkDependencies Response Message

```
        <fileInfo processor="MIPS" type="Application" os="Linux">
            <name>Core PCL Print Module</name>
            <description>This is Canon's very good PCL print
            module.</description>
            <versionInfo build="Golden Master"
            minimumBuild="Golden Master">
                <major>1</major>
                <minor>0</minor>
                <revision>3</revision>
                <buildNo>98</buildNo>
            </versionInfo>
        </fileInfo>
        <fileInfo processor="MIPS" type="Driver" os="Linux">
            <name>IPv4 Network Protocol</name>
            <description>Canon IPv4 Network Protocol
            Support.</description>
            <versionInfo build="Golden Master"
            minimumBuild="Golden Master">
                <major>3</major>
                <minor>1</minor>
                <revision>2</revision>
                <buildNo>23</buildNo>
            </versionInfo>
        </fileInfo>
    </fileList>
</checkDependenciesResponse>
```

In response to receiving the checkDependencies response message from the agent device, controller 105 determines which, if any, dependent files need updating by comparing the version information (versionInfo) of the dependent files installed on the agent device (as specified in the current state information) with the version information of the available dependent file updates specified in the checkDependencies request message sent by controller 105. If the dependent files installed on the device have an older version than the available dependent file updates, then the installed dependent files need to be updated. After determining whether any installed dependent files need to be updated, controller 105 generates and sends a checkForUpdates response message to the agent device (step 207). This checkForUpdates response message includes information for file updates, and associated dependent file updates, that need to be installed on the agent device. The order in which the files are listed in the checkForUpdates response message determines the order in which the agent device installs the file updates, as will be described below for step 213.

Table 30 shows an example checkForUpdates response message sent in response to controller 105 receiving the checkDependencies response message of Table 29.

TABLE 30 checkForUpdates Response Message Example
checkForUpdates Response Message

```
<?xml version="1.0" encoding="utf-8"?>
<checkForUpdatesResponse xmlns="http://www.canon.com/ns/pf/caums/2006/1.0/">
    <updateServiceInfo os="Linux" processor="MIPS">
        <name>CDA - Update Module</name>
        <versionInfo build="Golden Master" minimumBuild="Golden Master">
            <major>1</major>
            <minor>0</minor>
            <revision>1</revision>
            <buildNo>23</buildNo>
        </versionInfo>
        <updateInfo hasDependency="false">
            <id>1111-2222-3333-4444</id>
            <dateTimeStamp>1161119217</dateTimeStamp>
            <versionInfo build="Golden Master" minimumBuild="Golden Master">
```

TABLE 30-continued checkForUpdates Response Message Example
checkForUpdates Response Message

```
        <major>2</major>
        <minor>0</minor>
        <revision>0</revision>
        <buildNo>1</buildNo>
      </versionInfo>
      <installInfo>
        <fileName>UpdateService.msi</fileName>
        <fileSize>236549</fileSize>
        <locationURI>http://update.canon.com/updates/1234kDva23fQDfd345GADVd</locationURI>
        <commandLine>UpdateService.msi -i</commandLine>
      </installInfo>
      <uninstallInfo>
        <fileName>UpdateService.msi</fileName>
        <fileSize>236436</fileSize>
        <locationURI>http://update.canon.com/updates/1234kDva23fQDfd34lkfdj4i4</locationURI>
        <commandLine>UpdateService.msi -i</commandLine>
      </uninstallInfo> </updateInfo>
  </updateServiceInfo>
  <fileList>
    <fileInfo processor="MIPS" type="Application" isUpdateAvailable="true" os="Linux">
      <name>Very Fast Print Service</name>
      <description>Canon's very fast print service.</description>
      <versionInfo build="Golden Master" minimumBuild="Golden Master">
        <major>5</major>
        <minor>1</minor>
        <revision>1</revision>
        <buildNo>656</buildNo>
      </versionInfo>
      <updateInfo hasDependency="true">
        <id>abcd-efgh-ijkl-mnop</id>
        <dateTimeStamp>1161119217</dateTimeStamp>
        <versionInfo build="Golden Master" minimumBuild="Golden Master">
          <major>5</major>
          <minor>2</minor>
          <revision>0</revision>
          <buildNo>15</buildNo>
        </versionInfo>
        <installInfo>
          <fileName>PrinterService.msi</fileName>
          <fileSize>15689</fileSize>
          <locationURI>http://update.canon.com/updates/dkdfjeife239f3uo</locationURI>
          <commandLine>PrinterService.msi -i</commandLine>
        </installInfo>
        <uninstallInfo>
          <fileName>PrinterService__Uninstall.msi</fileName>
          <fileSize>25598</fileSize>
          <locationURI>http://update.canon.com/updates/view.php&id=324645</locationURI>
          <commandLine>PrinterService__Uninstall.msi -u</commandLine>
        </uninstallInfo>
      </updateInfo>
      <dependencyList>
        <DependencyInfo processor="MIPS" type="Application" os="Linux">
          <name>Core PCL Print Module</name>
          <description>This is Canon's very good PCL print module.</description>
          <updateInfo hasDependency="false">
            <id>aaaa-11111-bbbb-2222</id>
            <dateTimeStamp>1161119214</dateTimeStamp>
            <versionInfo build="Golden Master" minimumBuild="Golden Master">
              <major>1</major>
              <minor>1</minor>
              <revision>5</revision>
              <buildNo>111</buildNo>
            </versionInfo>
            <installInfo>
              <fileName>PCLcore.msi</fileName>
              <fileSize>15229</fileSize>
              <locationURI>http://update.canon.com/updates/ddsfres-usdrive-
pclcsde</locationURI>
                <commandLine>PCLcore.msi -i</commandLine>
            </installInfo>
            <uninstallInfo>
              <fileName>PCLcoreUninstall.msi</fileName>
              <fileSize>11598</fileSize>
              <locationURI>http://update.canon.com/updates/ddsfres-usdrive-
pclcsde</locationURI>
              <commandLine>PCLcore__Uninstall.msi -u</commandLine>
            </uninstallInfo>
```

TABLE 30-continued checkForUpdates Response Message Example
checkForUpdates Response Message

```
            </updateInfo>
          </DependencyInfo>
        </dependencyList>
    </fileInfo>
    <fileInfo processor="MIPS" type="Middleware" isUpdateAvailable="false" os="Linux">
        <name>UPnP Print Service</name>
        <description>Full UPnP version 1.1 support.</description>
        <versionInfo build="Beta" minimumBuild="Golden Master">
            <major>0</major>
            <minor>10</minor>
            <revision>0</revision>
            <buildNo>210</buildNo>
        </versionInfo>
    </fileInfo>
    <fileInfo processor="MIPS" type="Driver" isUpdateAvailable="true" os="Linux">
        <name>IPv6 Network Procotol</name>
        <description>Canon IPv6 Network Protocol Support.</description>
        <versionInfo build="Release Candidate" minimumBuild="Golden Master">
            <major>0</major>
            <minor>3</minor>
            <revision>5</revision>
            <buildNo>148</buildNo>
        </versionInfo>
        <updateInfo hasDependency="false">
            <id>wwww-rrrr-tttt-yyyy</id>
            <dateTimeStamp>1161119217</dateTimeStamp>
            <versionInfo build="Golden Master" minimumBuild="Golden Master">
                <major>1</major>
                <minor>0</minor>
                <revision>0</revision>
                <buildNo>215</buildNo>
            </versionInfo>
          <installInfo>
                <fileName>NetworkDriver.exe</fileName>
                <fileSize>1598632</fileSize>
                <locationURI>http://update.canon.com/updates/kdsfjsm-234r09k</locationURI>
                <commandLine>NetworkDriver.exe -i</commandLine>
            </installInfo>
            <uninstallInfo>
                <fileName>NetworkDriver__Uninstall.exe</fileName>
                <fileSize>1598583</fileSize>
                <locationURI>http://update.canon.com/updates/kdsfjsm-234kji8</locationURI>
                <commandLine>NetworkDriver__Uninstall.exe -u</commandLine>
            </uninstallInfo>
        </updateInfo>
    </flieInfo>
  </fileList>
</checkForUpdatesResponse>
```

As shown in Table 30, because the latest version of the "IPv4 Network Protocol" dependent file (listed in the checkDependencies request message of Table 28) is already installed on the agent device (as specified in the checkDependencies response message of Table 29), information for the "IPv4 Network Protocol" dependent file is not included in the checkForUpdates response message (and the hasDependency attribute of the updateInfo block for the "IPv6 Network Protocol" file has the value "false"). However, because the latest version of the "Core PCL Print Module" dependent file (listed in the checkDependencies request message of Table 28) is not installed on the agent device (as specified in the checkDependencies response message of Table 29), information for the "Core PCL Print Module" dependent file is included in the checkForUpdates response message (and the hasDependency attribute of the updateInfo block for the "Very Fast Print Service" file has the value "true").

If controller 105 had not sent a checkDependencies request message to the agent device, but had instead sent the checkForUpdates response message to the agent device without checking to see if dependent files were already installed on the device, then information for the "IPv4 Network Protocol" dependent file would have been included in the checkForUpdates response message (and the hasDependency attribute of the updateInfo block for the "IPv6 Network Protocol" file would have the value "true").

In response to receiving the checkForUpdates response message from controller 105, the agent device generates and sends a getFiles request message requesting controller 105 to download the available file updates and associated dependent file updates (step 208).

In the first example embodiment, the agent device requests controller 105 to download all available file updates and any associated dependent file updates. The agent device determines whether an update is available for an installed file based on the isUpdateAvailable attribute of the corresponding fileInfo block included in the checkForUpdates response message. If the isUpdateAvailable value is "true", then an update is available. If the isUpdateAvailable value is "false", then an update is not available.

For example, the agent device determines that updates are available for both the "Very Fast Print Service" and the "IPv6 Network Protocol" files because the isUpdateAvailable attributes of the corresponding fileInfo blocks included in the checkForUpdates response have the value “true”. The software agent determines that updates are not available for the “UPnP Print Service” file because the isUpdateAvailable attribute of the corresponding fileInfo block included in the checkForUpdates response message has the value “false”.

The agent determines that an update is needed for a dependent file if the dependent file is specified in a dependencyList block of the checkForUpdates response message. For example, because the “Core PCL Print Module” file is specified in the checkForUpdates response message of Table 30, an update for the “Core PCL Print Module” file is needed. However, because the “IPv4 Network Protocol” file is not specified in the checkForUpdates response message of Table 30, an update for the “IPv4 Network Protocol” file is not needed.

In other embodiments, the software agent can select which of the available file updates to download, either automatically or based on user input received from a user interface, and generate a getFiles request requesting controller 105 to download the selected file updates.

In the first example embodiment, the agent software requests to download the uninstall utility for an available file update when it requests to download the file update. However, in other embodiments, the agent software does not request to download the uninstall utility for an available file update when it requests to download the file update, but rather records the uninstall information (uninstallInfo block) for the uninstall utility, and requests to download the uninstall utility when the corresponding file is about to be removed.

In the first example embodiment, the agent device specifies the available file updates as well as the associated dependent file updates in the getFiles request message.

In other embodiments, the agent device specifies only the available file updates in the getFiles request message and does not specify the associated dependent file updates. After receiving the getFiles request from the agent, controller 105 automatically downloads the associated dependent file updates that need to be downloaded, as previously determined by controller 105 prior to sending the checkForUpdates response message.

In the first example embodiment of the invention, the agent device generates and sends the getFiles request message in response to receiving the checkForUpdates response message from controller 105. However, in other embodiments, the agent device can generate and send the getFiles request message based on a specified time, based on the availability of storage space on the agent device, based on network traffic, based on user input received from a user interface, or based on the occurrence of an event, or the like. Events can include, for example, the installation of a file, the uninstallation of a file, or the like.

The getFiles request message includes a getfileList block that includes a getFileInfo block for each file that the agent device has requested controller 105 to download. Table 31 shows an example getFiles request message sent by the agent device in response to receiving the checkForUpdates response message of Table 30.

TABLE 31 getFiles Request Message Example
getFiles Request Message

```
<?xml version="1.0" encoding="utf-8"?>
<getFiles xmlns="http://www.canon.com/ns/pf/caums/2006/1.0/">
    <getFileList>
        <getFileInfo id="aaaa-11111-bbbb-2222" fileName="PCLcore.msi"
locationURI="http://update.canon.com/updates/ddsfres-usdrive-pclcsde"/>
        <getFileInfo id="aaaa-11111-bbbb-2222" fileName="PCLcore_Uninstall.msi"
locationURI="http://update.canon.com/updates/ddsfres-usdrive-pclcsde"/>
        <getFileInfo id="9999-11111-8888-2222" fileName="PrinterService.msi"
locationURI="http://update.canon.com/updates/dkdfjeife239f3uo"/>
        <getFileInfo id="9999-11111-8888-2222" fileName="PrinterService_Uninstall.msi"
locationURI="http://update.canon.com/updates/view.php&id=324645"/>
        <getFileInfo id="abcd-efgh-ijkl-mnop" fileName="networkdriver.exe"
locationURI="http://update.canon.com/updates/asdfkf884flkjfd-afj238"/>
        <getFileInfo id="abcd-efgh-ijkl-mnop" fileName="networkdriver_Uninstall.exe"
locationURI="http://update.canon.com/updates/a;idjk39kldkkke-kdm971"/>
    </getFileList>
</getFiles>
```

As shown in Table 31, the getFiles request message requests to download both the installation utilities and the uninstall utilities for each of the available updates. Because the isUpdateAvailable attributes for the “Very Fast Print Service” and the “IPv6 Network Protocol” files included in the checkForUpdates response have the value “true”, updates for these files are available. Therefore the installation utilities (i.e., PrinterService.msi and networkdriver.exe) and uninstall utilities (i.e., PrinterService_Uninstall.msi and networkdriver_Uninstall.exe, respectively) for these available files updates are requested in the getFiles request of Table 31. Because a dependent file for the “Very Fast Print Service” file is needed (i.e., “Core PCL Print Module”), this file is also requested by the agent device in the getFiles request message.

Table 32 shows two example getFileInfo blocks included in the getFileList block of the getFiles request message of Table 31. These two getFileInfo blocks include information for the installation utility and the uninstall utility (respectively) for the “Very Fast Print Service” file update. Table 33 describes the elements and attributes included in the getFileInfo block.

TABLE 32 getFileInfo Block Example
getFileInfo Block

```
        <getFileInfo id="9999-11111-8888-2222"
        fileName="PrinterService.msi"
locationURI="http://update.canon.com/updates/dkdfjeife239f3uo"/>
        <getFileInfo id="9999-11111-8888-2222"
        fileName="PrinterService_Uninstall.msi"
locationURI="http://update.canon.com/updates/view.php&id=324645"/>
```

TABLE 33 getFileInfo Block Description

| Name | Type | Required | Description |
|---|---|---|---|
| id | element/string | Yes | Unique file package/update identifier. |
| fileName | element/stirng | Yes | File name of the file component/update. |
| locationURI | element/string | Yes | File package/update URI |

The "id" element of the getfileInfo block is the "id" element of the updateInfo block for the corresponding file update included in the checkDependencies response message. For the installation utility for a file update, the "filename" and "locationURI" elements of the getfileInfo block are the "filename" and "locationURI" elements (respectively) of the installInfo block of the updateInfo block for the corresponding file update included in the checkDependencies response message. For the uninstall utility for a file update, the "filename" and "locationURI" elements of the getfileInfo block are the "fileName" and "locationURI" elements (respectively) of the uninstallInfo block of the updateInfo block for the corresponding file update included in the checkDependencies response message. As shown in Table 32, the locationURI's are locations on a server accessible via the internet using the HTTP protocol.

Although the example locationURI's shown in the getFiles request message of Table 31 are all locations on the same server, the locationURI's included in getFiles request messages can include locationURI's that point to locations on different servers. For example, the locationURI for a file can include a location on a server of a vendor providing that particular file. Therefore, if the getFiles request message requests to download files provided by different vendors, then the getFiles request message will include locationURI's pointing to locations on servers of the different vendors.

In response to receiving the getFiles request message from the agent device, controller 105 sends a request to download the files specified in the received getFiles request message (step 209) and then downloads the files (step 210). In the first example embodiment, the request is an HTTP protocol GET request, but in other embodiments, controller 105 can use FTP (File Transfer Protocol), SMB (Server Message Block), or any other protocol suitable for downloading files.

In the first example embodiment, the files are stored on repository 107, and controller 105 sends the HTTP GET request to repository 107 to download the requested files from repository 107. However, in other embodiments, the files can be stored on servers accessible via the Internet other than repository 107, and controller 105 can download the requested files from these other servers. Example servers include servers of vendors of file updates, such as, for example, software vendors, or any other vendor.

Controller 105 stores the downloaded files in a persistent storage device accessible by controller 105. The persistent storage device can be any persistent storage device accessible by controller 105, such as, for example, the local storage device of controller 105, or a storage device remotely accessible by controller 105 via a network.

After storing the downloaded files in the persistent storage device, controller 105 generates and sends a getFiles response message to the agent device (step 211). The getFiles response message includes getFileInfo blocks for each downloaded file. Each getFileInfo block of the getFiles response message has the same "id" and "fileName" value of the corresponding getFileInfo block of the getFiles request message. In the first example embodiment, the locationURI of each getFileInfo block of the getFiles response message points to a location on controller 105.

Table 34 shows an example getFiles response message sent by controller 105 after downloading the files specified in the getFiles request message shown in Table 31.

TABLE 34 getFiles Response Message Example
getFiles Response Message

<?xml version="1.0" encoding="utf-8"?>
<getFileResponse xmlns="http://www.canon.com/ns/pf/caums/2006/1.0/">
    <getFileList>
        <getFileInfo id="aaaa-11111-bbbb-2222" fileName="PCLcore.msi" locationURI="http://controller/updates/ddsfres-usdrive-pclcsde"/>
        <getFileInfo id="aaaa-11111-bbbb-2222" fileName="PCLcore_Uninstall.msi" locationURI="http://controller/updates/ddsfres-usdrive-pclcsde"/>
        <getFileInfo id="9999-11111-8888-2222" fileName="PrinterService.msi" locationURI="http://controller/updates/dkdfjeife239f3uo"/>
        <getFileInfo id="9999-11111-8888-2222" fileName="PrinterService_Uninstall.msi" locationURI="http://controller/updates/view.php&id=324645"/>
        <getFileInfo id="abcd-efgh-ijkl-mnop" fileName="networkdriver.exe" locationURI="http://controller/updates/asdfkf884flkjfd-afj238"/>
        <getFileInfo id="abcd-efgh-ijkl-mnop" fileName="networkdriver_Uninstall.exe" locationURI="http://controller/updates/a;idjk39kldkkke-kdm971"/>
    </getFileList>
</getFileResponse>

In response to receiving the getFiles response message from controller 105, the agent device sends a download request to controller 105 to download the files specified in the received getFiles request message (step 212) and then downloads the files (step 213). In the first example embodiment, the request is an HTTP protocol GET request, but in other embodiments, the agent can use FTP (File Transfer Protocol), SMB (Server Message Block), or any other protocol suitable for downloading files.

After downloading the file updates, the agent device installs the downloaded file updates. For each file update, the agent device installs the file according to the information in the corresponding installInfo block of the checkForUpdates response message received from controller 105 in step 207.

For example, after downloading the "PrinterService.msi" file from controller 105, the agent device installs the "Very Fast Print Service" update by executing the command "PrinterService.msi-i".

In the first example embodiment, the file updates are installed in the order listed in the received checkForUpdates response message Any dependent files associated with a file update are installed before the associated file update. If more than one dependent file is associated with a file update, then the dependent files are installed in the order in which they appear in the dependencyList block of the associated file update.

For example, after downloading the available file updates and needed dependent files specified in the checkForUpdates response message of Table 30, the agent installs the downloaded files in the following order:

PCLcore.msi

PrinterService.msi

NetworkDriver.exe

Because PCLcore.msi contains a dependent file needed by the file update contained in PrinterServie.msi (as specified in the checkForUpdates response message of Table 30), PCLcore.msi is installed before PrinterService.msi. Because PrinterServie.msi is listed before NetworkDriver.exe in the checkForUpdates response message of Table 30, the agent device installs PrinterServie.msi before NetworkDriver.exe.

After installing the updates, the agent device updates the current state information stored on the agent device. Specifically, for each installed file, the agent device updates the corresponding current state information to include the corresponding versionInfo, installInfo commandLine, and uninstallInfo commandLine information of the checkForUpdates response message received from controller 105 in step 207.

Table 35 shows example updated current state information stored on the agent device after the agent device installs updates for the “Very Fast Print Service”, “IPv6 Network Protocol”, and “Core PCL Print Module” files.

TABLE 35

Updated Current State Information Example
Current State Information

```
<agentInfo os=“Linux” processor=“MIPS”>
    <name>Canon Inc - Agent</name>
    <doCheckDependencies>true</doCheckDependencies>
    <versionInfo build=“Golden Master” minimumBuild=“Golden Master”>
        <major>1</major>
        <minor>0</minor>
        <revision>2</revision>
        <buildNo>2</buildNo>
    </versionInfo>
</agentInfo>
<deviceInfo>
        <name>Canon DSLR Professional Camera</name>
        <model>20D</model>
        <type>Digital SLR Camera</type>
    </deviceInfo>
<fileList>
    <fileInfo processor=“MIPS” type=“Application” os=“Linux”>
        <name>Very Fast Print Service</name>
        <description>Canon’s very fast print service.</description>
        <versionInfo build=“Golden Master” minimumBuild=“Golden Master”>
            <major>5</major>
            <minor>2</minor>
            <revision>0</revision>
            <buildNo>15</buildNo>
        </versionInfo>
       <installInfo>
         <commandLIne>PrinterService.msi -i</commandLine>
       </uninstallInfo>
       <uninstallInfo>
         <commandLIne>PrinterService_Uninstall.msi -u</commandLine>
       </uninstallInfo>
    </fileInfo>
    <fileInfo processor=“MIPS” type=“Middleware” os=“Linux”>
        <name>UPnP Print Service</name>
        <description>Full UPnP version 1.1 support.</description>
        <versionInfo build=“Beta” minimumBuild=“Golden Master”>
            <major>0</major>
            <minor>10</minor>
            <revision>0</revision>
            <buildNo>210</buildNo>
        </versionInfo>
    </fileInfo>
    <fileInfo processor=“MIPS” type=“Driver” os=“Linux”>
        <name>IPv6 Network Procotol</name>
        <description>Canon IPv6 Network Protocol Support.</description>
            <versionInfo build=“Release Candidate” minimumBuild=“Golden Master”>
            <major>1</major>
            <minor>0</minor>
            <revision>0</revision>
            <buildNo>215</buildNo>
        </versionInfo>
       <installInfo>
         <commandLIne>NetworkDriver.exe -i</commandLine>
       </uninstallInfo>
      <uninstallInfo>
         <commandLIne>NetworkDriver_Uninstall.exe -u</commandLine>
```

TABLE 35-continued

Updated Current State Information Example
Current State Information

```
        </uninstallInfo>
    </fileInfo>
    <fileInfo processor="MIPS" type="Application" os="Linux">
            <name>Core PCL Print Module</name>
            <description>This is Canon's very good PCL print module.</description>
            <versionInfo build="Golden Master" minimumBuild="Golden Master">
                <major>1</major>
                <minor>1</minor>
                <revision>5</revision>
                <buildNo>111</buildNo>
            </versionInfo>
          <installInfo>
                <commandLIne>PCLcore.msi -i</commandLine>
          </uninstallInfo>
          <uninstallInfo>
                <commandLIne>PCLcore__Uninstall.msi -u</commandLine>
          </uninstallInfo>
      </fileInfo>
      <fileInfo processor="MIPS" type="Driver" os="Linux">
          <name>IPv4 Network Protocol</name>
          <description>Canon IPv4 Network Protocol Support.</description>
          <versionInfo build="Golden Master" minimumBuild="Golden Master">
                <major>3</major>
                <minor>1</minor>
                <revision>2</revision>
                <buildNo>23</buildNo>
          </versionInfo>
      </fileInfo>
</fileList>
```

In the first example embodiment, the agent device uses the uninstall information that is stored as current state information for a file when the agent device uninstalls the file. In the first example embodiment, the agent device uses the installation information that is stored as current state information for a file when the agent device re-installs the file.

After the agent device updates the current state information, the agent device generates and sends a downloadComplete request message to controller 105 (step 214). The downloadComplete request message is used to inform controller 105 that the agent device has retrieved the desired files from controller 105, and that it is safe for controller 105 to delete the files from the persistent storage device. Table 36 shows an example downloadComplete request message sent by the agent device after downloading the files listed in the getFiles request message of Table 31.

TABLE 36 downloadComplete Request Message Example
downloadComplete Request Message

```
<?xml version="1.0" encoding="utf-8"?>
<downloadComplete xmlns="http://www.canon.com/ns/pf/caums/2006/1.0/">
   <downloadCompleteList>
        <downloadFileInfo id="aaaa-11111-bbbb-2222" fileName="PCLcore.msi"
locationURI="http://update.canon.com/updates/ddsfres-usdrive-pclcsde"/>
        <downloadFileInfo id="aaaa-11111-bbbb-2222" fileName="PCLcore__Uninstall.msi"
locationURI="http://update.canon.com/updates/ddsfres-usdrive-pclcsde"/>
        <downloadFileInfo id="9999-11111-8888-2222" fileName="PrinterService.msi"
locationURI="http://update.canon.com/updates/dkdfjeife239f3uo"/>
        <downloadFileInfo id="9999-11111-8888-2222" fileName="PrinterService__Uninstall.msi"
locationURI="http://update.canon.com/updates/view.php&id=324645"/>
        <downloadFileInfo id="abcd-efgh-ijkl-mnop" fileName="networkdriver.exe"
locationURI="http://update.canon.com/updates/asdfkf884flkjfd-afj238"/>
        <downloadFileInfo id="abcd-efgh-ijkl-mnop" fileName="networkdriver__Uninstall.exe"
locationURI="http://update.canon.com/updates/a; idjk39kldkkke-kdm971"/>
     </getFileList>
   </downloadCompleteList>
</downloadComplete>
```

In response to receiving the downloadComplete request message from the agent, controller 107 deletes the files specified in the downloadComplete request message from the persistent storage device. After deleting the files, controller 107 sends a downloadComplete response message to the agent device, informing the agent of any errors that might have occurred from the deletion process. Table 37 shows an example downloadComplete response message indicating that no errors have occurred.

TABLE 37 downloadComplete Response Message Example
downloadComplete Response Message

```
<?xml version="1.0" encoding="utf-8"?>
<downloadCompleteResponse xmlns="http://www.canon.com/ns/pf/
```

TABLE 37-continued

| downloadComplete Response Message Example<br>downloadComplete Response Message |
|---|
| caums/2006/1.0/"><br><error code="0"><br><description>No Error</description><br></error><br></downloadCompleteResponse> |

In the first example embodiment, after receiving the getFiles request message from the agent device at step 208, if controller 105 determines that it cannot store retrieved files in the persistent storage device (for example, because there is no available space on the storage device), then controller 105 performs a proxy download instead of performing steps 209 and 210 to download the files. Similarly, if controller 105 determines that the agent does not have access rights for retrieving files from the persistent storage device and/or access rights for requesting controller 105 to store files on the persistent storage device, then controller 105 performs a proxy download instead of performing steps 209 and 210 to download the files. When performing a proxy download, controller 105 sends the same getSoftware response message at step 211 that it would have sent had it downloaded the files at steps 209 and 210. In response to receiving a download request from the agent device at step 212, controller 105 acts as a proxy server by downloading the requested file(s) from repository 107, and transferring the downloaded files to the agent device without storing the downloaded files in the persistent storage device. While performing the proxy download, controller 105 uses its memory as a buffer to temporarily cache data to be quickly transferred to the agent device in chunks. The size of chunk is configurable depending on the available memory on controller 105. After performing the proxy download, and in response to receiving a downloadComplete request message at step 214, controller 105 sends the same downloadComplete response message at step 215 that it would have sent had controller 105 performed a non-proxy download. In this manner, the proxy download process is transparent to the agent device, such that the agent device interacts with controller 105 in the same manner for both a proxy and a non-proxy download.

Figure 6:
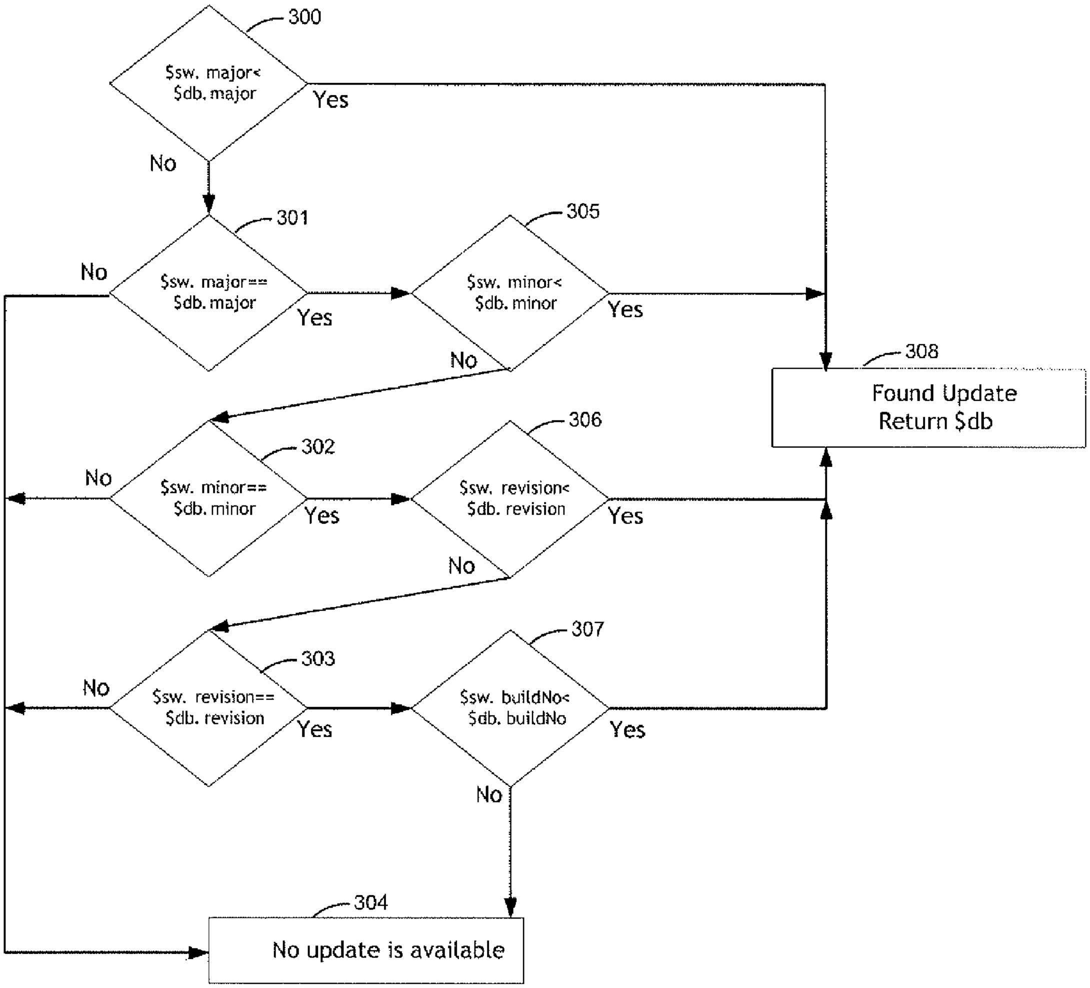
FIG. 6 is a flow diagram illustrating a process for finding updates, according to the first example embodiment.

FIG. 6 is a flow diagram illustrating the process performed by repository 107 (in step 203 of FIG. 5) for comparing the version information of the upgradeable file ($sw) installed on the agent device with the version information of the file update information ($db) stored in the repository's database. Both the installed upgradeable file and the file update have a major version, minor version, revision number, and build number. At block 300, repository 107 compares the major version of the installed file ($sw.major) with the major version of the file update ($db.major). If the major version of the installed file is less than the major version of the file update ("Yes" at block 300), then at block 308, repository 107 identifies the file update as a newer version of the file installed on agent device.

If the major version of the installed file is not less than the major version of the file update ("No" at block 300), then at block 301, repository 107 determines whether the major version of the installed file ($sw.major) is equal to the major version of the file update ($db.major).

If the major version of the installed file is not equal to the major version of the file update ("No" at block 301), then at block 304, it is determined that the file update is not a newer version of the file installed on the agent device.

If the major version of the installed file is equal to the major version of the file update ("Yes" at block 301), then processing proceeds to block 305. At block 305, repository 107 compares the minor version of the installed file ($sw.minor) with the minor version of the file update ($db.minor). If the minor version of the installed file is less than the minor version of the file update ("Yes" at block 305), then at block 308, repository 107 identifies the file update as a newer version of the file installed on agent device. If the minor version of the installed file not less than the minor version of the file update ("NO" at block 305), then processing proceeds to block 302. At block 302, repository 107 determines whether the minor version of the installed file ($sw.minor) is equal to the minor version of the file update ($db.minor).

If the minor version of the installed file is not equal to the minor version of the file update ("No" at block 302), then at block 304, it is determined that the file update is not a newer version of the file installed on the agent device.

If the minor version of the installed file is equal to the minor version of the file update ("Yes" at block 302), then processing proceeds to block 306, where repository 107 determines whether the revision number of the installed file ($sw.revision) is less than the revision number of the file update ($db.revision). If the revision number of the installed file is less than the revision number of the file update ("Yes" at block 306), then at block 308, repository 107 identifies the file update as a newer version of the file installed on agent device. If the revision number of the installed file is not less than the revision number of the file update ("No" at block 306), then processing proceeds to block 303, where repository 107 determines whether the revision number of the installed file ($sw.revision) is equal to the revision number of the file update ($db.revision).

If the revision number of the installed file is not equal to the revision number of the file update ("No" at block 303), then at block 304, it is determined that the file update is not a newer version of the file installed on the agent device.

If the revision number of the installed file is equal to the revision number of the file update ("Yes" at block 303), then processing proceeds to block 307, where repository 107 determines whether the build number of the installed file ($sw.build) is less than the build number of the file update ($db.build).

If the build number of the installed file is less than the build number of the file update ("Yes" at block 307), then at block 308, repository 107 identifies the file update as a newer version of the file installed on agent device. If the build number of the installed file is not less than the build number of the file update ("No" at block 307), then at block 304, it is determined that the file update is not a newer version of the file installed on the agent device.

Second Embodiment

In the second example embodiment, agent devices have "roles" and the repository uses these roles to determine which files the agent device needs.

Figure 7:
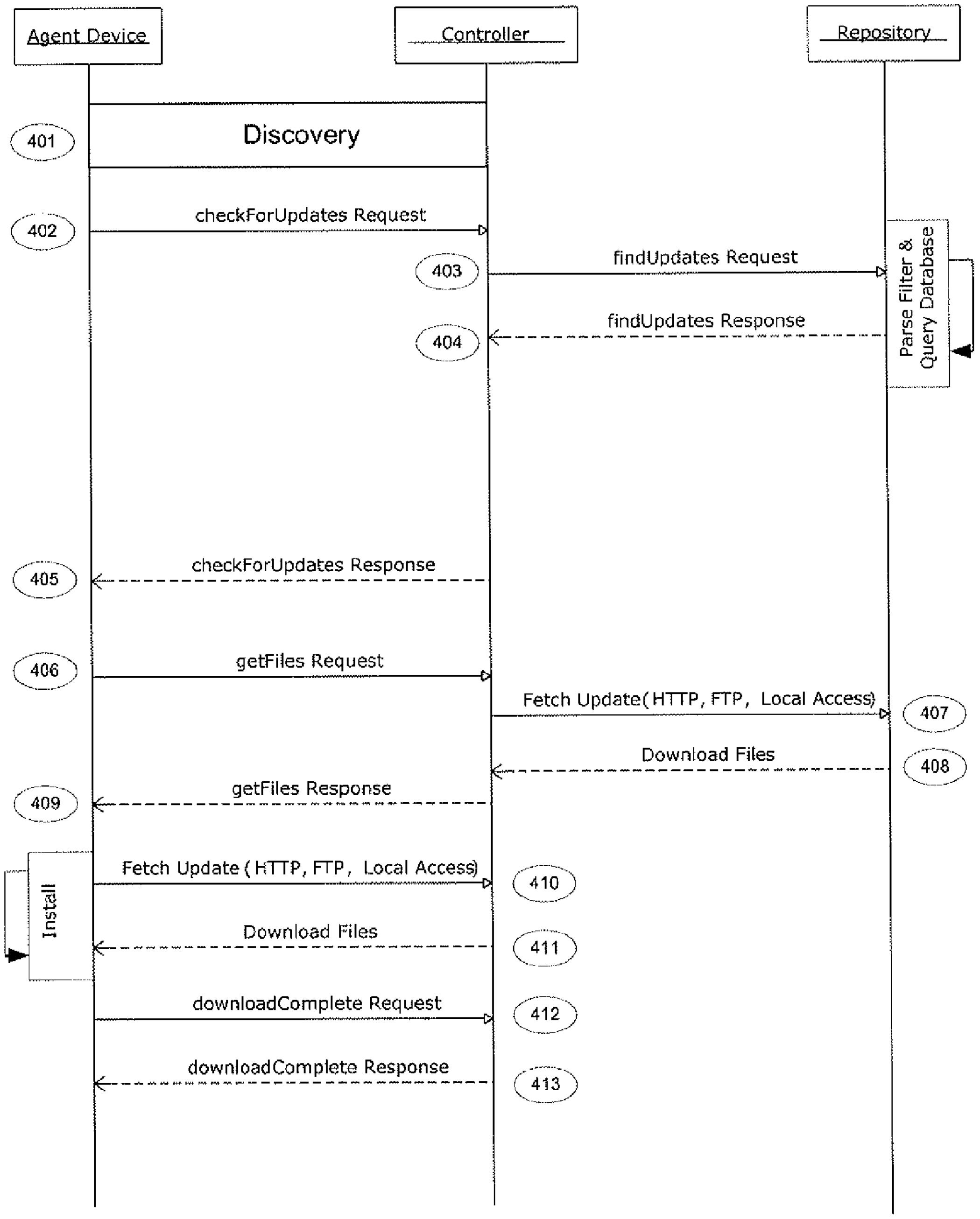
FIG. 7 is a sequence diagram illustrating the interaction between components of the file update system, according to a second example embodiment.

FIG. 7 is a sequence diagram illustrating the interaction between an agent device, a controller device, and a repository similar to the agent devices, controller, and repository (respectively) of FIG. 1. In the second example embodiment, the agent device is a multi-function device that is operable in one or more "roles". The repository uses these roles to associate one or more files with the agent device. Example roles include "printer", "copier", "fax", "Main Studio Configuration", "Canon 40D", "Canon 40D with Photo Service", and the like.

For example, the agent device can be a Canon 40D digital SLR camera that can have one of two different roles, "Canon 40D" or "Canon 40D with Photo Service", and the "Canon 40D with Photo Service" role can be associated with files needed to communicate with a Canon photo service over the Internet.

The role of the device is specified in the deviceInfo block of the current state information stored on the agent device. Table 38 shows an example deviceInfo block of the current state information of an agent device having one role.

TABLE 38 deviceInfo Block Example with Role
deviceInfo Block

```
<deviceInfo>
    <name>Canon DSLR Professional Camera</name>
    <model>20D</model>
    <type>Digital SLR Camera</type>
    <role>Main Studio Configuration</role>
</deviceInfo>
```

Step 401 is similar to step 201 of FIG. 5. Step 402 is similar to step 202 of FIG. 5, except that the deviceInfo block of the checkForUpdates request message specifies one or more roles of the agent device. Step 403 is similar to step 203 of FIG. 5, except that the deviceInfo block of the findUpdates request message specifies one or more roles of the agent device.

At step 404, the repository receives the findUpdates request message from the controller, and determines file updates needed by the agent device (including any associated dependent files) based on the role (or roles) of the agent device, as specified in the deviceInfo block of the findUpdates request message. In the second example embodiment, the repository parses the deviceInfo block to extract the roles of the agent device. File update information for each file update is associated with one or more roles. The repository queries the database to find file update information for all file updates associated with the roles of the agent device. After finding file update information for all file updates associated with the roles of the agent device, the repository generates a findUpdates response message that includes this file update information, in a manner similar to the manner described above for step 204 of FIG. 5. Thereafter, the repository sends the findUpdates response message to the agent device.

Because the repository determines which file updates are needed by the agent device based on the role of the device, the controller does not need to send a checkDependencies request to the agent device to determine which dependent files are already installed on the agent device.

Steps 405, 406, 407, 408, 409, 410, 411, 412 and 413 are similar to steps 207, 208, 209, 210, 211, 212, 213, 214 and 215 (respectively), as described above for FIG. 5.

Third Embodiment

In the third example embodiment, agent devices are directly connected to the Internet, and after receiving a checkForUpdates response message from the controller, an agent device downloads file updates from the Internet directly, without using the controller.

Figure 8:
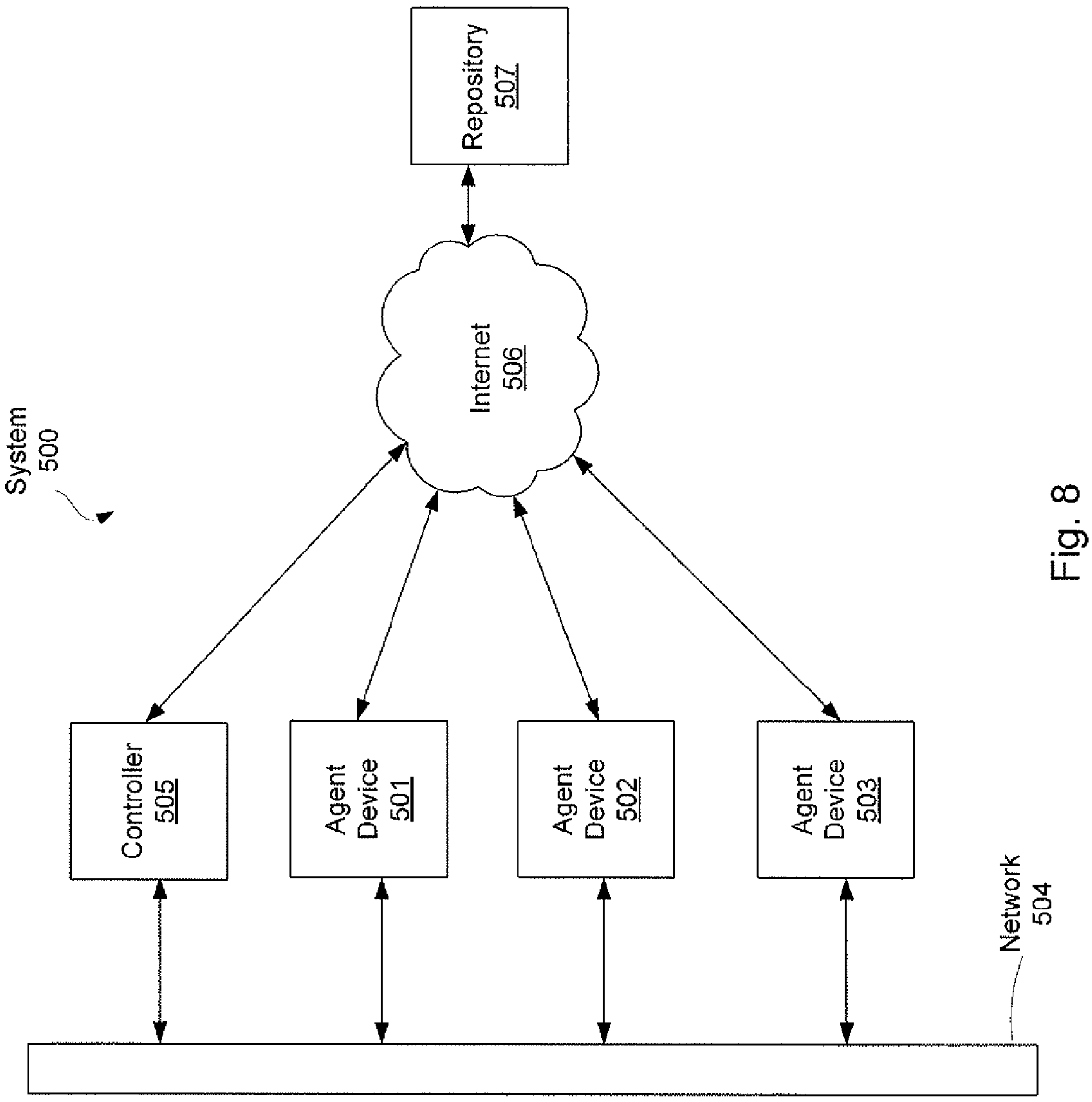
FIG. 8 depicts a file update system, according to a third example embodiment of the invention.

FIG. 8 depicts a file update system 500 in which agent devices are connected to the Internet. System 500 includes agent devices 501 to 503, controller 505, and repository 507. Agent devices 501 to 503 are similar to agent devices 101 to 103 of FIG. 1, and controller 505 and repository 507 are similar to controller 105 and repository 107 of FIG. 1 (respectively). Agent devices 501 to 503 are each communicatively coupled to controller device 505 via network 504. In the third example embodiment, network 504 is an Intranet, but in other embodiments, network 504 can be, for example, a wireless network, a home network, or the like. Repository 507 is communicatively coupled to controller device 505 via network 506. Agent devices 501 to 503 are also directly connected to the network 506. In the third example embodiment, the network 506 is the Internet, but in other embodiments, this network 506 can be, for example, an Intranet, a wireless network, a home network, or the like.

Figure 9:
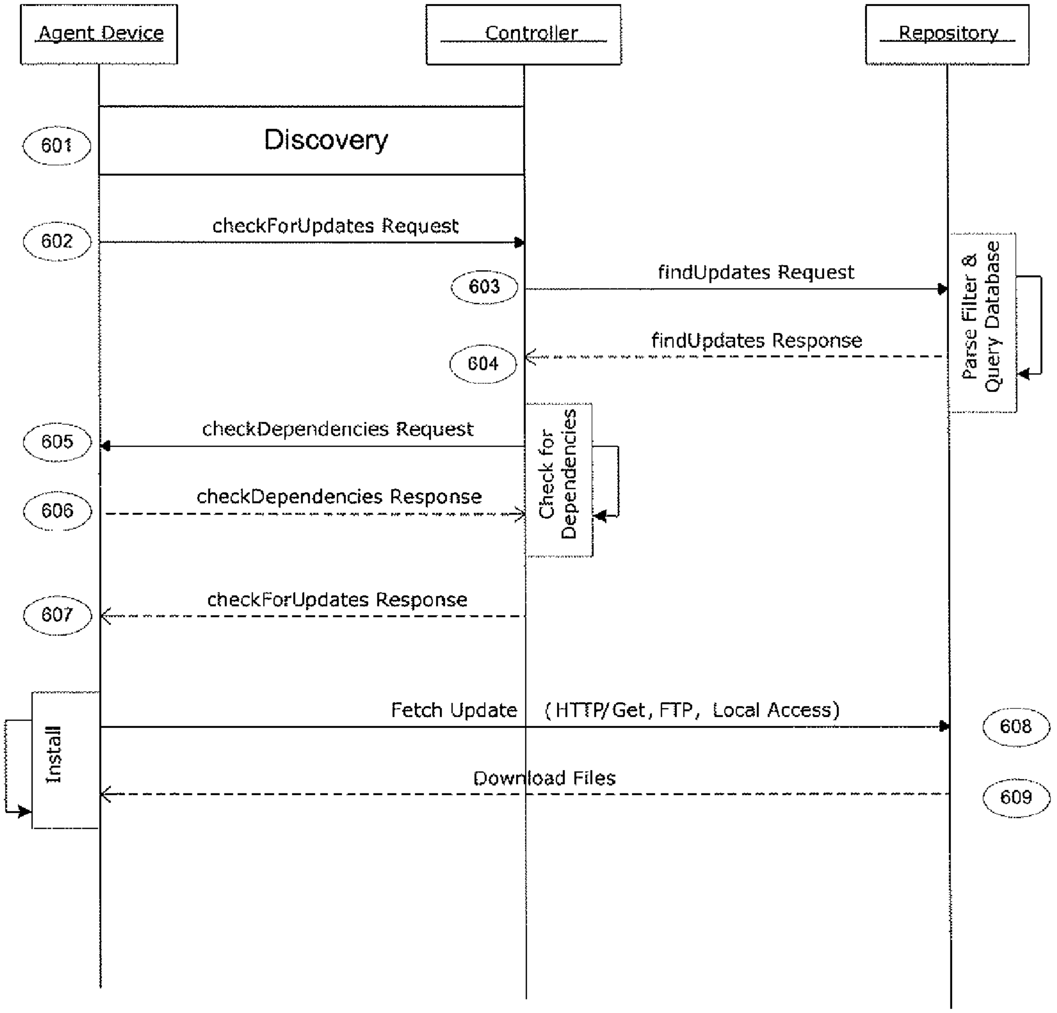
FIG. 9 is a sequence diagram illustrating the interaction between components of the file update system, according to the third example embodiment.

FIG. 9 is a sequence diagram illustrating the interaction between an agent device, a controller device, and a repository. Steps 601 to 607 are similar to steps 201 to 207, as described above for FIG. 5. In response to receiving the checkForUpdates response message from controller 505 at step 607, the agent device sends a download request to the repository to download the files specified in the received checkForUpdates request message (step 608) and then downloads the files (step 609). In the third example embodiment, the request is an HTTP protocol GET request, but in other embodiments, the agent can use FTP (File Transfer Protocol), SMB (Server Message Block), or any other protocol suitable for downloading files.

After downloading the file updates, the agent device installs the downloaded file updates and updates the current state information stored on the agent device, in a manner similar to the manner described above in the description of step 213 of FIG. 5.

Fourth Embodiment

In the fourth example embodiment, the update system includes multiple controllers which cache retrieved files. Each controller discovers other controllers capable of communicating with the agent devices in the update system, and each agent device discovers controllers capable of communicating with the agent device.

To check for file updates, an agent device selects one of the discovered controllers and sends a checkForUpdates request message to the selected controller. If the selected controller cannot process the checkForUpdates request, the selected controller discovers another controller that can process the request. After finding another controller that can process the agent device's request, the selected controller sends the agent device controller location information for the new controller so that the agent device can communicate with the new controller. After receiving the controller location information for the new controller, the agent device resends the checkForUpdates request to the new controller, based on the received controller location information.

Similarly, if the selected controller cannot process a getFiles request message received from the agent device, the selected controller discovers another controller that can process the request. After finding another controller that can process the agent device's request, the selected controller sends the agent device controller location information for the new controller so that the agent device can communicate with the new controller. After receiving the controller location information for the new controller, the agent device resends the getFiles request to the new controller, based on the received controller location information.

Before downloading a file from the repository, or another server connected to the Internet, the selected controller determines whether another controller already stores the file. If another controller already has the file, the selected controller does not download the file from the Internet. Instead, the selected controller informs the agent device that this file is already stored on the other controller, and the agent device retrieves the cached file from the other controller.

Figure 10:
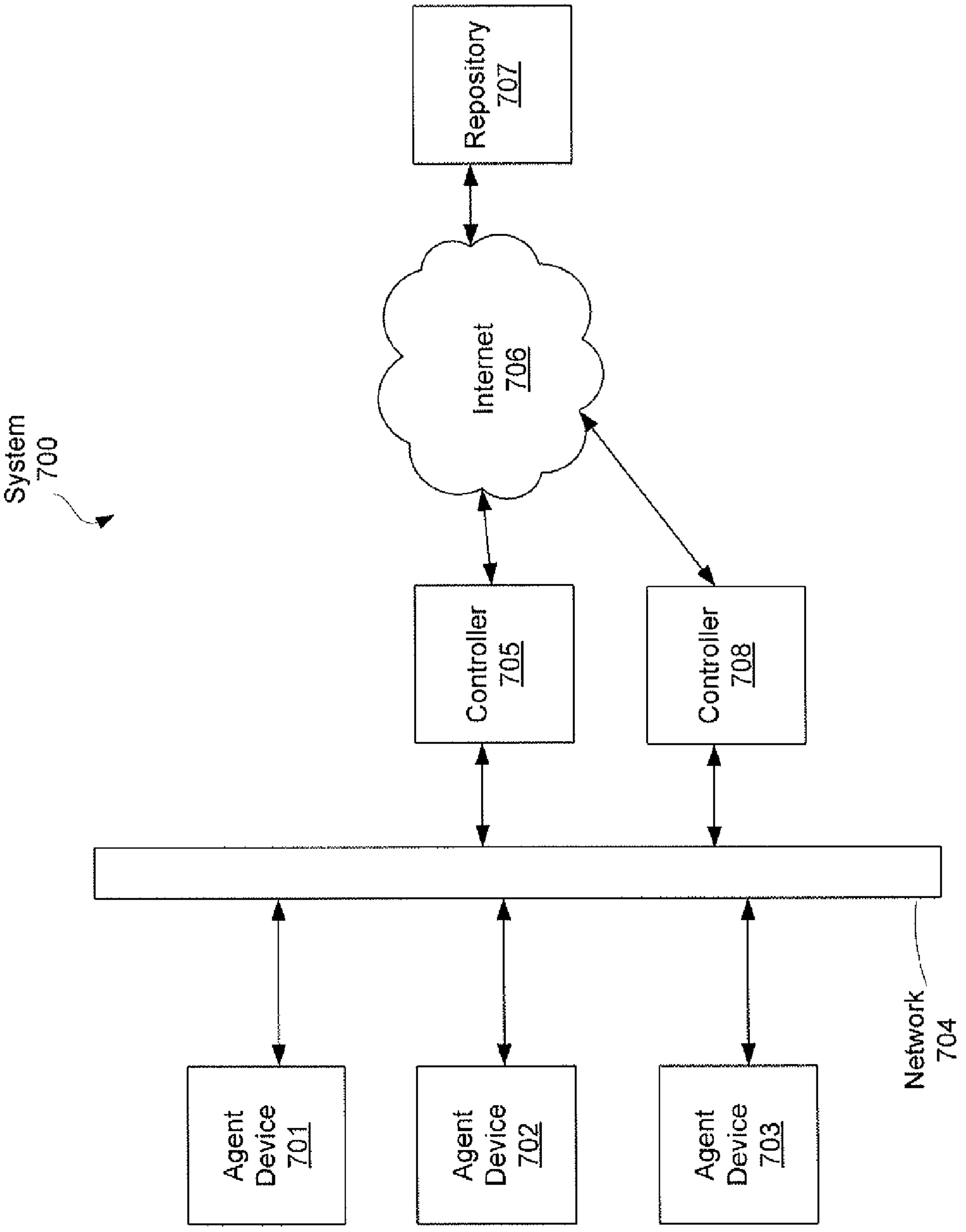
FIG. 10 depicts a file update system, according to a fourth example embodiment of the invention.

FIG. 10 depicts a file update system 700 that includes multiple controllers. System 700 includes agents devices 701 to 703, controllers 705 and 708, and repository 707. The depiction of only two controllers in FIG. 10 is intended only to assist in clarity of explanation, and in other embodiments, system 700 can include any number of controllers. Agent devices 701 to 703 are similar to agent devices 101 to 103 of FIG. 1, controllers 705 and 708 are similar to controller 105 of FIG. 1, and repository 707 is similar to repository 107 of FIG. 1.

Controllers 705 and 708 each store a manifest data file that contains a list of files stored on a persistent storage device accessible by the controller. Each file listed in the manifest data file is specified by an identifier assigned by repository 707. The persistent storage device can be any persistent storage device accessible by the controller, such as, for example, the local storage device of the controller, or a storage device remotely accessible by the controller via a network. The manifest data file is an XML file, but in other embodiments, the manifest data file can be any other type of file, such as, for example, a text file.

The manifest data file also indicates the available storage space on the persistent storage device. In the fourth example embodiment, the manifest data file is stored on the same persistent storage device on which the other files are stored. However, in other embodiments, the manifest data file and the other files listed in the manifest data file can be stored on different persistent storage devices.

The manifest data file also includes security information synchronized with security policies of agent devices communicatively coupled to the controller. Security information for each agent device includes, for example, the protocol that the agent device uses to login (e.g., Single Device Login (SDL)), the access control policy (e.g., Access Control List (ACL)) used by the agent device to define restrictions and permissions of a specific user or group, and any other security information. The access control policy information includes, for example, user access levels, file access rights, and system resource restrictions for a user. User access levels include roles, such as, for example, “Administrator”, “Power User”, “General User”, “Guest”, and the like. File access rights include, for example, write, read, and read/write permissions, and the like. System resource restrictions for a user include, for example, the maximum amount of hard disk space that can be used by the user, the maximum file size that can be downloaded by the user, and the like.

Each controller is responsible for maintaining and synchronizing its own manifest data file. A controller can only write to its own manifest data file, but it can read the manifest data file of other controllers in system 700.

Agent devices 701 to 703 are each communicatively coupled to controller devices 705 and 708 via network 704. In the fourth example embodiment, network 704 is an Intranet, but in other embodiments, network 704 can be, for example, a wireless network, a home network, or the like. Repository 707 is communicatively coupled to controller devices 705 and 708 via network 706. Agent devices 701 to 703 are not directly connected to network 706, but rather communicate via network 706 through controller devices 705 and 708. Controller devices 705 and 708 are communicatively coupled to each other via both network 704 and network 706. In the fourth example embodiment, network 706 is the Internet, but in other embodiments, this network 706 can be, for example, an Intranet, a wireless network, a home network, or the like.

Controllers discover each other’s presence upon receiving an announcement message that is broadcast when a controller joins network 704. Controllers are also notified that a controller has left network 704 because controllers broadcast a message informing the other controllers when they leave network 704. Controllers read each other’s manifest files during this discovery process, and store a local copy of the discovered controller’s manifest data file. Controllers determine whether to update any locally stored copies of other controller’s manifest data files based on information such as, for example, an expiration time, or a pre-configured time interval. A controller can update its manifest file to indicate that the controller’s manifest data file is inaccessible to other controllers.

Before an agent device checks for updates, it discovers controllers (e.g., 705 and 708) using the Simple Service Discovery Protocol (SSDP) protocol. In other embodiments, the agent device can use another protocol, such as, for example, Jini, Service Location Protocol (SLP) or Web Services Dynamic Discovery (WS-Discovery), to discover controllers. The agent device also notifies each discovered controller of the other controllers discovered by the agent device during this discovery process.

After discovering available controllers, the agent device selects one of the available controllers. After selecting a controller, the agent device sends a checkForUpates request message to the selected controller, as described above for step 202 of FIG. 5.

In response to receiving the checkForUpdates request message, the selected controller determines whether it can process the checkForUpdates request. If the selected controller is unavailable because, for example, it cannot store files on the persistent storage device, it lacks sufficient processing resources, the controller’s network connection is slow or unavailable, the agent does not have access rights for requesting the controller to check for updates, or for any other reason, then the selected controller discovers another controller that can process the request. The selected controller determines whether a discovered controller can process the request based on the information included in the manifest data file of the discovered controller. For example, the selected controller can determine whether the discovered controller can process the request based on, for example, the available storage space on the persistent storage device (as indicated by the manifest data file), the security information included in the manifest data file, or any other information included in the manifest data file. If the selected controller does not have a locally stored copy of a manifest data file for one of the other controllers, or if the local copy of the other controller’s manifest data file is not up-to-date, then the selected controller fetches a copy of the other controller’s manifest data file from the other controller.

After finding another controller that can process the agent device’s request, the selected controller sends the agent device controller location information for the new controller so that the agent device can communicate with the new controller. After receiving the controller location information for the new controller, the agent device resends the checkForUpdates request to the new controller, based on the received controller location information.

If the selected controller can process the checkForUpates request message, the selected controller sends a findUpdates request message to repository 707, as described above for step 203 of FIG. 5, and repository 707 responds by sending a findUpdates response message, as described above for step

204 of FIG. 5. After receiving the findUpdates response message, the selected controller checks for dependencies, if needed, as described above for steps 205 and 206 of FIG. 5, and sends a checkForUpdates response message to the agent device, as described above for step 207 of FIG. 5. In response to receiving the checkForUpdates request message, the agent device sends a getFiles request message to the selected controller, as described above for step 208 of FIG. 5.

In response to receiving the getFiles request message, the selected controller determines whether it can process the getFiles request. If the selected controller is unavailable because, for example, it cannot store files on the persistent storage device, it lacks sufficient processing resources, the controller's network connection is slow or unavailable, the agent does not have access rights for requesting the controller to get files, or for any other reason, then the selected controller discovers another controller that can process the request. The selected controller determines whether a discovered controller can process the request based on the information included in the manifest data file of the discovered controller. For example, the selected controller can determine whether the discovered controller can process the request based on, for example, the available storage space on the persistent storage device (as indicated by the manifest data file), the security information included in the manifest data file, or any other information included in the manifest data file. If the selected controller does not have a locally stored copy of a manifest data file for one of the other controllers, or if the local copy of the other controller's manifest data file is not up-to-date, then the selected controller fetches a copy of the other controller's manifest data file from the other controller.

After finding another controller that can process the agent device's request, the selected controller sends the agent device controller location information for the new controller so that the agent device can communicate with the new controller. After receiving the controller location information for the new controller, the agent device resends the getFiles request to the new controller, based on the received controller location information.

If the selected controller can process the getFiles request message, then the selected controller determines whether another controller capable of communicating with the agent device stores any of the files before downloading any files specified in the received getFiles request message. The selected controller makes this determination by searching the manifest data files of other discovered controllers to determine whether a file ID specified in a manifest data file matches a file ID of a file specified in the received getFiles request message. The selected controller can search locally stored manifest data files of other controllers. If the selected controller does not have a locally stored copy of a manifest data file for one of the other controllers, or if the local copy of the other controller's manifest data file is not up-to-date, then the selected controller fetches a copy of the other controller's manifest data file from the other controller. If a requested file is stored on another controller, then the selected controller does not download the file from the Internet.

After determining whether other controllers store any files listed in the getFiles request message, the selected controller downloads any requested files that are not stored on other controllers and caches the downloaded files. After determining whether other controllers store any requested files, and after downloading and caching any remaining files, the selected controller sends a getFiles response message to the agent device. For any file retrieved from another controller, the corresponding locationURI in the getFiles response message has the location of the controller storing the requested file.

After receiving the getFiles response message, the agent device fetches the updates as described above for steps 212 and 213 of FIG. 5. After fetching the updates, the agent device sends a downloadComplete request message to the selected controller. Before deleting a file in response to receiving the downloadComplete request message, the selected controller determines whether another controller is attempting to acquire the file from the selected controller. The selected controller makes this determination by checking a read count of the file. If the file is being accessed by another controller, the selected controller updates its manifest data file to remove the file ID of the file so that no other controllers will attempt to access the file. Thereafter, the selected controller periodically checks the read count of the file until it determines that no other controller is accessing the file. If the file is not accessed by another controller, then the selected controller deletes the file. After all files have been deleted, the selected controller sends the agent device a downloadComplete response message.

The exemplary embodiments of the invention have been described above with respect to particular illustrative embodiments, however, various changes and modifications may be made without departing from the scope of the invention. For example, in general, steps of methods described above may be performed in a different order and still achieve desirable results.

What is claimed is:

1. A method for retrieving file updates from the Internet for updating information stored in files on a device not connected to the Internet, wherein the device includes a software agent and is communicatively coupled to a separate controller that includes a connection to the Internet, the method comprising:

a discovering step, wherein said software agent running on the device discovers the controller when the controller is communicatively coupled to the device via a first network, wherein the first network has a first network topology, and wherein the software agent and the controller communicate according to the first network topology;

a maintaining step of maintaining current state information indicating upgradeable files currently installed on the device;

a first requesting step, wherein the software agent sends the current state information to the controller via the first network according to the first network topology;

a second requesting step, wherein the controller sends the current state information to a repository via the Internet, wherein the Internet has a second network topology different than the first network topology, and wherein the controller and the repository communicate according to the second network topology;

an update checking step, wherein the repository determines upgradeable files currently installed on the device based on the current state information, and checks for file updates for the determined upgradeable files;

a first sending step, wherein the repository sends file update information for file updates discovered in the update checking step to the controller, and wherein the file update information includes file update locations on the Internet of each file update;

a second sending step, wherein the controller sends the file update information to the software agent via the first network;

a third requesting step, wherein the software agent requests, according to the first network topology and via the first network, the controller to retrieve file updates based on the file update information;

a fourth requesting step, responsive to the software agent's request in the third requesting step, wherein the controller requests, according to the second network topology, each file update from its file update location based on the file update information, wherein the controller retrieves each file update from its file update location;

a notification step, wherein the controller sends a notification to the software agent when the file updates are retrieved in the fourth requesting step; and a second retrieving step, wherein the software agent retrieves the file updates from the controller, in response to the notification, wherein before performing the fourth requesting step, the controller discovers other controllers capable of communicating with the device, and determines whether a discovered controller stores a file update requested in the third requesting step, and wherein in a case where the controller determines that a discovered controller stores a file update requested in the third requesting step, in the fourth requesting step the controller does not retrieve the file update stored on the discovered controller, and in the second retrieving step the software agent retrieves the stored file update from the discovered controller, instead of from the controller which receives the software agent's request in the third requesting step.

2. The method of claim 1, wherein the current state information specifies a list of upgradeable files currently installed on the device.

3. The method of claim 2, wherein the current file list specifies a version, file type, target operating system, and target processor for each upgradeable file, and the repository checks for file updates based on this information in the update checking step.

4. The method of claim 1, wherein the device is a multi-function device that is operable in different roles, and wherein the current state information specifies a role of the device.

5. The method of claim 1, wherein the file update locations include locations on the repository and locations on other devices.

6. The method of claim 1, wherein the file update locations are Universal Resource Locators (URLs).

7. The method of claim 1, wherein, if the controller cannot process a request received by the software agent, the controller discovers a new controller that can process the request, and sends the software agent controller location information for the new controller, and wherein the software agent resends the request to the new controller, based on the controller location information.

8. The method of claim 1, wherein the file update information comprises file installation information and file uninstall information, and wherein the file installation information includes information for retrieving and running an installation utility, and the file uninstall information includes information for retrieving and running an uninstall utility.

9. The method of claim 1, wherein in the fourth requesting step, the controller caches retrieved file updates.

10. The method of claim 1, wherein the file update information indicates dependent files associated with the file updates.

11. The method of claim 10, further comprising a dependency checking step, wherein the controller determines if the dependent files are installed on the device, wherein in the fourth requesting step, the controller retrieves any dependent files not installed on the device.

12. The method of claim 1, wherein the device and controller include at least one of video cameras, digital cameras, printers, computers, scanners, facsimile machines, copiers, display devices, network access points, photolithography systems, and computers.

13. The method of claim 1, wherein the repository includes computers and network attached storage devices.

14. The method of claim 1, wherein the files include software files and data files, the software files including application files, driver files, firmware files and middleware files, and the data files including text files, media files, and database files.

15. The method of claim 1, wherein if the controller cannot store retrieved files in a persistent storage device, the controller can use a memory as a buffer to temporarily cache data to be transferred to the agent in chunks.

16. The method of claim 1, wherein the software agent includes a Simple Object Access Protocol (SOAP) module for communicating with the controller using SOAP, the software agent processes update messages received from the controller, and the software agent generates update messages sent to the controller, wherein the controller includes an update service which includes a SOAP module for communicating with the software agent and the repository, the update service processes update messages received from the software agent and the repository, and the update service generates update messages sent to the software agent and the repository, and wherein the repository includes a repository module which includes a SOAP module for communicating with the controller using SOAP, the repository module processes update messages received from the controller, and the repository module generates update messages sent to the controller.

17. A controller for retrieving file updates from the Internet for updating information stored in files on a separate device not connected to the Internet, wherein the device includes a software agent and is communicatively coupled to the controller which includes a connection to the Internet, the controller comprising:

a computer-readable memory constructed to store computer-executable instructions implementing process steps; and at least one processor constructed to execute the computer-executable instructions stored in the computer-readable memory, wherein the process steps implemented by the computer-executable instructions stored in the computer-readable memory comprise:

a first requesting step, wherein the controller receives current state information from the software agent via a first network according to a first network topology of the first network, wherein the current state information indicates upgradeable files currently installed on the device, wherein the software agent and the controller communicate according to the first network topology, and wherein the software agent runs on the device and discovers the controller when the controller is communicatively coupled to the device via the first network;

a second requesting step, wherein the controller sends the current state information to a repository via the Internet, wherein the Internet has a second network topology different than the first network topology, and wherein the controller and the repository communicate according to the second network topology;

a sending step, wherein the controller receives file update information from the repository, and sends the file update information to the software agent via the first network, wherein the file update information includes file update locations on the Internet of each file update discovered by the repository for upgradeable files currently installed on the device, as determined by the current state information sent by the controller;

a third requesting step, responsive to a request by the software agent to retrieve file updates based on the file update information, wherein the controller requests, according to the second network topology, each file update from its file update location based on the file update information, wherein the controller retrieves each file update from its file update location, and wherein the request by the software agent to retrieve file updates based on the file update information is sent to the controller according to the first network topology and via the first network; and a notification step, wherein the controller sends a notification to the software agent when the file updates are retrieved in the third requesting step;

wherein the software agent retrieves the file updates from the controller, in response to the notification; and wherein before performing the third requesting step, the controller discovers other controllers capable of communicating with the device, and determines whether a discovered controller stores a file update requested in the third requesting step, and wherein in a case where the controller determines that a discovered controller stores a file update requested in the third requesting step, in the third requesting step the controller does not retrieve the file update stored on the discovered controller, and the software agent retrieves the stored file update from the discovered controller, instead of from the controller which receives the software agent's request in the third requesting step.

* * * * *